(12) United States Patent
Liu et al.

(10) Patent No.: US 10,992,427 B2
(45) Date of Patent: Apr. 27, 2021

(54) BANDWIDTH RESERVATION SIGNAL FOR BASE STATION OPERATION IN DIGITAL MODULATION

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 16/259,992

(22) Filed: Jan. 28, 2019

(65) Prior Publication Data

US 2019/0238284 A1   Aug. 1, 2019

Related U.S. Application Data

(60) Provisional application No. 62/624,695, filed on Jan. 31, 2018.

(51) Int. Cl.
*H04L 5/00* (2006.01)
*H04W 72/04* (2009.01)
(Continued)

(52) U.S. Cl.
CPC .......... *H04L 5/0007* (2013.01); *H04L 5/0048* (2013.01); *H04L 5/0083* (2013.01);
(Continued)

(58) Field of Classification Search
CPC ... H04L 5/0007; H04L 5/0048; H04L 5/0083; H04L 27/2613; H04L 27/2666;
(Continued)

(56) References Cited

U.S. PATENT DOCUMENTS 10,187,887 B2 *   1/2019   Ahn ................... H04W 72/042
2016/0234707 A1 *   8/2016   Kazmi ................. H04W 24/08
(Continued)

OTHER PUBLICATIONS

International Search Report and Written Opinion—PCT/US2019/015631—ISA/EPO—May 6, 2019 (181944WO).
(Continued)

*Primary Examiner* — Kibrom T Hailu
(74) *Attorney, Agent, or Firm* — Liem T. Do

(57) ABSTRACT

Methods, systems, and devices for wireless communications are described. A base station may identify a plurality of downlink carriers for a transmission time interval (TTI), e.g., a subframe. The base station may identify a period of inactivity for one or more of the plurality of downlink carriers during the TTI, which may correspond to one or more orthogonal frequency division multiplexing (OFDM) symbols of the subframe. The base station may transmit narrowband reference signals (NB-RSs) over the one or more carriers during the period of inactivity according to a channel reservation narrowband reference signal (NB-RS) pattern. The channel reservation NB-RS pattern may include a first set of time-frequency resources associated with a baseline NB-RS pattern and a second set of supplemental time-frequency resources associated with a period of inactivity.

24 Claims, 15 Drawing Sheets

(51) Int. Cl.
*H04L 27/26* (2006.01)
*H04W 52/02* (2009.01)
*H04W 52/14* (2009.01)
*H04W 52/44* (2009.01)
*H04W 52/32* (2009.01)

(52) U.S. Cl.
CPC ...... *H04L 27/2613* (2013.01); *H04L 27/2666* (2013.01); *H04W 52/0216* (2013.01); *H04W 52/0219* (2013.01); *H04W 52/0229* (2013.01); *H04W 72/0446* (2013.01); *H04L 5/0085* (2013.01); *H04W 52/143* (2013.01); *H04W 52/325* (2013.01); *H04W 52/44* (2013.01)

(58) Field of Classification Search
CPC ............ H04L 5/0085; H04W 52/0216; H04W 52/0219; H04W 52/0229; H04W 72/0446; H04W 52/143; H04W 52/325; H04W 52/44
See application file for complete search history.

(56) References Cited

U.S. PATENT DOCUMENTS

| | | | |
|---|---|---|---|
| 2017/0180095 A1* | 6/2017 | Xue | H04L 5/0048 |
| 2017/0317806 A1* | 11/2017 | Beale | H04W 48/10 |
| 2017/0359820 A1 | 12/2017 | Gaal et al. | |
| 2018/0076995 A1* | 3/2018 | Pelletier | H04L 5/0037 |
| 2018/0097586 A1* | 4/2018 | Kim | H04L 5/0098 |
| 2018/0192313 A1* | 7/2018 | Axmon | H04B 17/318 |
| 2018/0227148 A1* | 8/2018 | Chatterjee | H04L 5/005 |
| 2018/0242179 A1* | 8/2018 | Rathonyi | H04W 72/048 |
| 2019/0036756 A1* | 1/2019 | Yi | H04L 67/12 |
| 2019/0089504 A1* | 3/2019 | Hwang | H04L 27/26 |
| 2019/0150151 A1* | 5/2019 | Nader | H04L 5/001 370/329 |
| 2019/0387409 A1* | 12/2019 | Thangarasa | H04W 16/00 |

OTHER PUBLICATIONS

Sony: "Considerations on Reference Signals in NB-IoT", 3GPP Draft; R1-160177, 3rd Generation Partnership Project (3GPP), Mobile Competence Centre, 650, Route Des Lucioles, F-06921 Sophia-Antipolis Cedex, France, vol. RAN WG1. No. Budapest, HU; Jan. 18, 2016-Jan. 20, 2016, Jan. 17, 2016 (Jan. 17, 2016), 5 Pages, XP051053496, Retrieved from the Internet: URL: http://www.3gpp.org/ftp/Meetings_3GPP_SYNC/RAN1 /Docs/ [retrieved on Jan. 17, 2016].

ZTE: "Details on NB-RS for NB-IoT", 3GPP Draft; R1-160475 NB-RS, 3rd Generation Partnership Project (3GPP), Mobile Competence Centre, 650, Route Des Lucioles, F-06921 Sophia-Antipolis Cedex, France, vol. RAN WG1. No. St Julian's, Malta; Feb. 15, 2016-Feb. 19, 2016, Feb. 14, 2016 (Feb. 14, 2016), 4 Pages, XP051053808, Retrieved from the Internet: URL: http://www.3gpp.org/ftp/Meetings_3GPP_SYNC/RAN1/Docs/ [retrieved on Feb. 14, 2016].

* cited by examiner

BANDWIDTH RESERVATION SIGNAL FOR BASE STATION OPERATION IN DIGITAL MODULATION

CROSS REFERENCE

The present Application for Patent claims the benefit of U.S. Provisional Patent Application No. 62/624,695 by Liu et al., entitled "Bandwidth Reservation Signal For Base Station Operation in Digital Modulation," filed Jan. 31, 2018, assigned to the assignee hereof, and expressly incorporated by reference herein in its entirety.

BACKGROUND

The following relates generally to wireless communication, and more specifically to bandwidth reservation signal for base station operation in digital modulation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Narrowband communications involve communicating with a limited frequency bandwidth as compared to the frequency bandwidth used for LTE communications. One example of narrowband communication is narrowband (NB) Internet of Things (IoT) (NB-IoT) communication, which may be limited to a single resource block (RB) of system bandwidth, e.g., 180 kHz. Another example of narrowband communication is enhanced machine-type communication (eMTC), which may be limited to six RBs of system bandwidth, e.g., 1.08 MHz. NB-IoT communication and/or eMTC may reduce device complexity, enable multi-year battery life, and provide deeper coverage to reach challenging locations such as deep inside buildings.

SUMMARY

The described techniques relate to improved methods, systems, devices, or apparatuses that support bandwidth reservation signal for base station operation in digital modulation. Generally, the described techniques provide for systems and methods for transmitting reference signals during periods of inactivity on one or more downlink carriers. A base station may identify a plurality of downlink carriers for a transmission time interval (TTI), e.g., a subframe. The base station may identify a period of inactivity for one or more of the plurality of downlink carriers during the TTI, which may correspond to one or more orthogonal frequency division multiplexing (OFDM) symbols of the subframe. The base station may transmit narrowband reference signals (NB-RSs) over the one or more downlink carriers during the period of inactivity according to a channel reservation narrowband reference signal (NB-RS) pattern. The channel reservation NB-RS pattern may include a first set of time-frequency resources associated with a baseline NB-RS pattern and a second set of supplemental time-frequency resources associated with a period of inactivity.

A method of wireless communication is described. The method may include identifying, by a wireless device, a plurality of downlink carriers for a transmission time interval (TTI), identifying a period of inactivity for one or more downlink carriers of the plurality of downlink carriers during the TTI, and transmitting narrowband reference signals (NB-RSs) over the one or more downlink carriers during the period of inactivity according to a channel reservation narrowband reference signal (NB-RS) pattern, the channel reservation NB-RS pattern including a first set of time-frequency resources associated with a baseline NB-RS pattern and a second set of supplemental time-frequency resources associated with the period of inactivity.

An apparatus for wireless communication is described. The apparatus may include means for identifying, by a wireless device, a plurality of downlink carriers for a transmission time interval (TTI), means for identifying a period of inactivity for one or more downlink carriers of the plurality of downlink carriers during the TTI, and means for transmitting narrowband reference signals (NB-RSs) over the one or more downlink carriers during the period of inactivity according to a channel reservation narrowband reference signal (NB-RS) pattern, the channel reservation NB-RS pattern including a first set of time-frequency resources associated with a baseline NB-RS pattern and a second set of supplemental time-frequency resources associated with the period of inactivity.

Another apparatus for wireless communication is described. The apparatus may include a processor, memory in electronic communication with the processor, and instructions stored in the memory. The instructions may be operable to cause the processor to identify, by a wireless device, a plurality of downlink carriers for a transmission time interval (TTI), identify a period of inactivity for one or more downlink carriers of the plurality of downlink carriers during the TTI, and transmit narrowband reference signals (NB-RSs) over the one or more downlink carriers during the period of inactivity according to a channel reservation narrowband reference signal (NB-RS) pattern, the channel reservation NB-RS pattern including a first set of time-frequency resources associated with a baseline NB-RS pattern and a second set of supplemental time-frequency resources associated with the period of inactivity.

A non-transitory computer-readable medium for wireless communication is described. The non-transitory computer-readable medium may include instructions operable to cause a processor to identify, by a wireless device, a plurality of downlink carriers for a transmission time interval (TTI), identify a period of inactivity for one or more downlink carriers of the plurality of downlink carriers during the TTI, and transmit narrowband reference signals (NB-RSs) over the one or more downlink carriers during the period of inactivity according to a channel reservation narrowband reference signal (NB-RS) pattern, the channel reservation NB-RS pattern including a first set of time-frequency resources associated with a baseline NB-RS pattern and a second set of supplemental time-frequency resources associated with the period of inactivity.

Some examples of the method, apparatus, and non-transitory computer-readable medium described above may further include processes, features, means, or instructions for boosting a power of the NB-RSs transmitted during the period of inactivity.

Some examples of the method, apparatus, and non-transitory computer-readable medium described above may further include processes, features, means, or instructions for transmitting the NB-RSs using the boosted power, where the boosted power may be a multiple, e.g., six times, of a baseline power associated with reference signal transmission during periods of activity.

In some examples of the method, apparatus, and non-transitory computer-readable medium described above, the first set of time-frequency resources may include a first set orthogonal frequency division multiplexing (OFDM) symbols. In some examples of the method, apparatus, and non-transitory computer-readable medium described above, the second set of time-frequency resources may include a second set of OFDM symbols.

In some examples of the method, apparatus, and non-transitory computer-readable medium described above, the first set of OFDM symbols may include a sixth OFDM symbol of the TTI, a seventh OFDM symbol of the TTI, a thirteenth OFDM symbol of the TTI, and a fourteenth OFDM symbol of the TTI.

In some examples of the method, apparatus, and non-transitory computer-readable medium described above, the second set of OFDM symbols may include a first OFDM symbol of the TTI, a second OFDM symbol of the TTI, a fifth OFDM symbol of the TTI, an eighth OFDM symbol of the TTI, a ninth OFDM symbol of the TTI, and a twelfth OFDM symbol of the TTI.

In some examples of the method, apparatus, and non-transitory computer-readable medium described above, the second set of time-frequency resources may include time-frequency resources associated with cell-specific reference signals.

A method of wireless communication is described. The method may include determining, by a wireless device, a period of inactivity for a downlink channel during a transmission time interval (TTI), receiving a plurality of narrowband reference signals (NB-RSs) on the downlink channel during the period of inactivity, where the plurality of NB-RSs are received according to a channel reservation narrowband reference signal (NB-RS) pattern, the channel reservation NB-RS pattern including a first set of time-frequency resources associated with a baseline NB-RS pattern and a second set of supplemental time-frequency resources associated with the period of inactivity, and transmitting one or more measurement signals based at least in part on the plurality of NB-RSs.

An apparatus for wireless communication is described. The apparatus may include means for determining, by a wireless device, a period of inactivity for a downlink channel during a transmission time interval (TTI), means for receiving a plurality of narrowband reference signals (NB-RSs) on the downlink channel during the period of inactivity, where the plurality of NB-RSs are received according to a channel reservation NB-RS pattern, the channel reservation NB-RS pattern including a first set of time-frequency resources associated with a baseline NB-RS pattern and a second set of supplemental time-frequency resources associated with the period of inactivity, and means for transmitting one or more measurement signals based at least in part on the plurality of NB-RSs.

Another apparatus for wireless communication is described. The apparatus may include a processor, memory in electronic communication with the processor, and instructions stored in the memory. The instructions may be operable to cause the processor to determine, by a wireless device, a period of inactivity for a downlink channel during a transmission time interval (TTI), receive a plurality of narrowband reference signals (NB-RSs) on the downlink channel during the period of inactivity, where the plurality of NB-RSs are received according to a channel reservation narrowband reference signal (NB-RS) pattern, the channel reservation NB-RS pattern including a first set of time-frequency resources associated with a baseline NB-RS pattern and a second set of supplemental time-frequency resources associated with the period of inactivity, and transmit one or more measurement signals based at least in part on the plurality of NB-RSs.

A non-transitory computer-readable medium for wireless communication is described. The non-transitory computer-readable medium may include instructions operable to cause a processor to determine, by a wireless device, a period of inactivity for a downlink channel during a transmission time interval (TTI), receive a plurality of narrowband reference signals (NB-RSs) on the downlink channel during the period of inactivity, where the plurality of NB-RSs are received according to a channel reservation narrowband reference signal (NB-RS) pattern, the channel reservation NB-RS pattern including a first set of time-frequency resources associated with a baseline NB-RS pattern and a second set of supplemental time-frequency resources associated with the period of inactivity, and transmit one or more measurement signals based at least in part on the plurality of NB-RSs.

In some examples of the method, apparatus, and non-transitory computer-readable medium described above, the first set of time-frequency resources may include a first set of orthogonal frequency division multiplexing (OFDM) symbols. In some examples of the method, apparatus, and non-transitory computer-readable medium described above, the second set of time-frequency resources may include a second OFDM symbols.

In some examples of the method, apparatus, and non-transitory computer-readable medium described above, the first set of OFDM symbols may include a sixth OFDM symbol of the TTI, a seventh OFDM symbol of the TTI, a thirteenth OFDM symbol of the TTI, and a fourteenth OFDM symbol of the TTI.

In some examples of the method, apparatus, and non-transitory computer-readable medium described above, the second set of OFDM symbols may include a first OFDM symbol of the TTI, a second OFDM symbol of the TTI, a fifth OFDM symbol of the TTI, an eighth OFDM symbol of the TTI, a ninth OFDM symbol of the TTI, and a twelfth OFDM symbol of the TTI.

In some examples of the method, apparatus, and non-transitory computer-readable medium described above, the second set of time-frequency resources may include time-frequency resources associated with cell-specific resource signals.

DETAILED DESCRIPTION

In order to satisfy a minimum bandwidth criteria, a base station may select a plurality of downlink carriers based at least in part on the minimum bandwidth criteria. For example, the minimum bandwidth criteria may be 500 kHz, and each downlink carrier may have a bandwidth of 200 kHz. Accordingly, the base station may select at least three downlink carriers. When the base station is transmitting on three or more downlink carriers, the minimum bandwidth criteria will be satisfied.

However, when one or more of the downlink carriers is not active (i.e., the base station is not transmitting on the downlink carrier), the minimum bandwidth criteria may not be satisfied. For example, when only one of three downlink carriers is active, the base station may be using only 200 kHz of bandwidth.

In order to satisfy the minimum bandwidth criteria, the base station may identify a period of inactivity for one or more downlink carriers during a transmission time interval (TTI). The TTI may correspond to a subframe. The base station may transmit reference signals on the one or more downlink carriers during the period of inactivity. The reference signals may be, for example, narrowband reference signals (NB-RSs), and the base station may transmit the NB-RSs according to a channel reservation narrowband reference signal (NB-RS) pattern.

The channel reservation NB-RS pattern may include a first set of time-frequency resources associated with a baseline NB-RS pattern and a second set of supplemental time-frequency resources associated with the period of inactivity. The first set of time-frequency resources may include time resources corresponding to a set of orthogonal frequency division multiplexing (OFDM) symbols used for reference signal transmission during periods of activity. If there are active DL subframes, NB-RS may not be repeated so as to save the REs as data already occupy all the REs in the active DL subframes. The second set of supplemental time-frequency resources may include time resources corresponding to legacy cell-specific reservation signal OFDM frames. In some examples, a legacy standalone NB-IoT device (e.g., a base station) may not transmit cell specific reference signal (CRS), but NB-RS is present in all valid downlink subframes. As such, if at least one of the plurality of downlink carriers is active and one or more of the plurality of downlink carriers are inactive, the NB-IoT device may transmit a channel reservation signal including an NB-RS and repetitions on the NB-RS on the legacy CRS locations, e.g., OFDM symbols during which the legacy CRS may be transmitted.

Aspects of the disclosure are initially described in the context of a wireless communications system. Aspects of the disclosure are further illustrated by and described with reference to apparatus diagrams, system diagrams, and flowcharts that relate to bandwidth reservation signal for base station operation in digital modulation.

Figure 1:
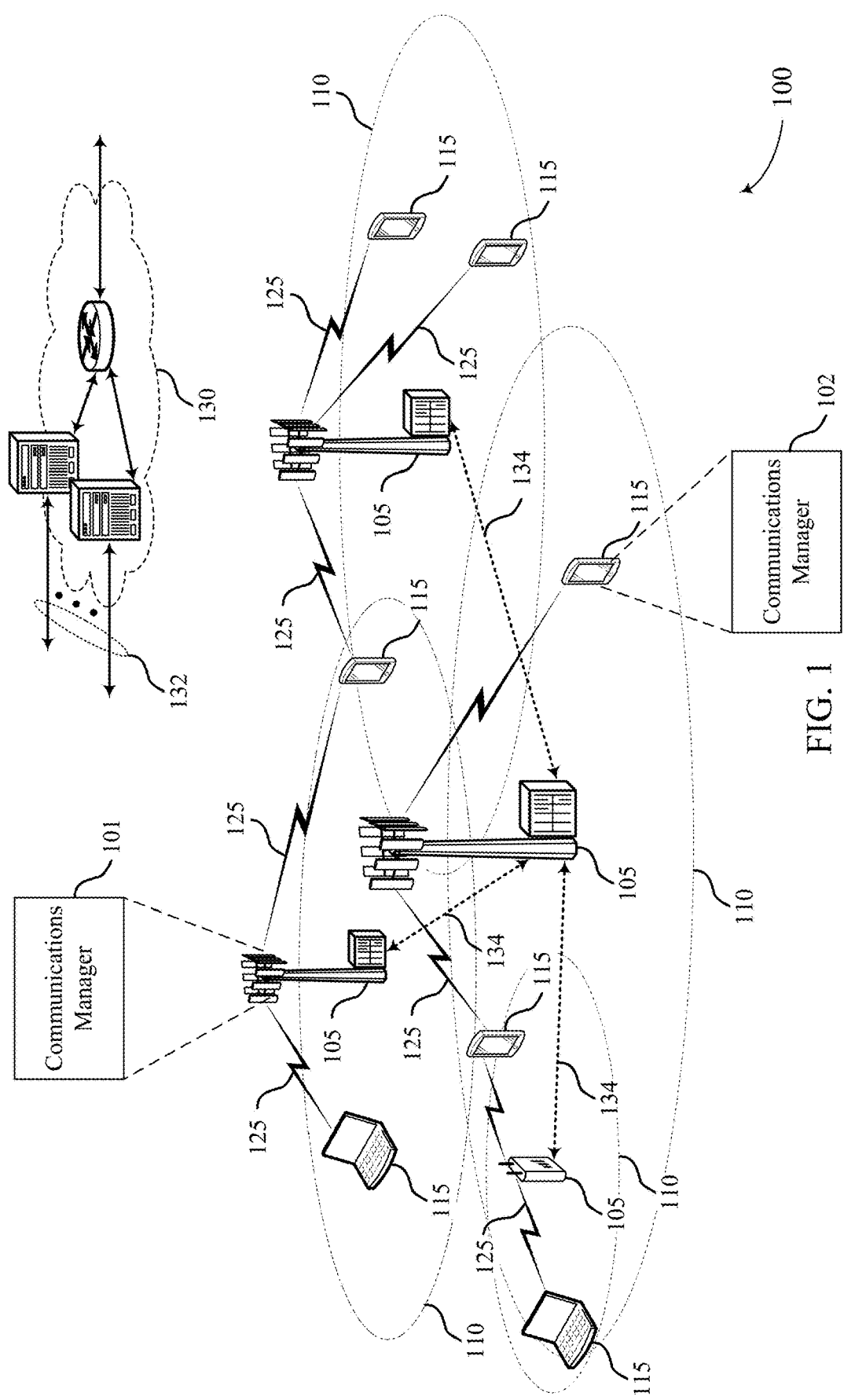
FIG. 1 illustrates an example of a system for wireless communication that supports bandwidth reservation signal for base station operation in digital modulation in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data.

A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 may include a communications manager 101, which may transmit reference signals on one or more downlink carriers during periods of inactivity. The communications manager 101 may identify a plurality of downlink carriers for a transmission time interval (TTI), which may be a subframe. In some examples, the communications manager 101 may identify downlink carriers for a TTI by identifying downlink carriers for a larger time period of which the TTI is a component, e.g., the communications manager 101 may identify downlink carriers for a subframe by identifying downlink carriers for the frame that includes the subframe. The communications manager 101 may identify the plurality of downlink carriers based at least in part on a minimum bandwidth criteria and the bandwidth of the downlink carriers.

The communications manager 101 may identify a period of downlink activity for one or more downlink carriers of the plurality of downlink carriers. For example, where two or more downlink carriers are scheduled to be inactive for the same period of the TTI (e.g., the entire TTI or the same portion thereof), the communications manager 101 may identify a single period of downlink activity for the two or more downlink carriers. Where two or more downlink carriers are scheduled to be inactive during the TTI, but the portions of the TTI during which they will be inactive are not the same, the communications manager 101 may identify a different period of inactivity for each of the downlink carriers.

The communications manager 101 may transmit, via a transmitter/transceiver, narrowband reference signals (NB-RSs) over the one or more downlink carriers during the identified period of inactivity. In some examples, the communications manager 101 may transmit the NB-RSs according to a channel reservation narrowband reference signal (NB-RS) pattern including a first set of time-frequency resources associated with a baseline NB-RS pattern and a second set of supplemental time-frequency resources associated with the period of inactivity.

The first set of time-frequency resources may include time-frequency resources that are reserved for reference signals during periods of activity. For example, time resources corresponding to a first set of OFDM symbols may be used for reference signal transmission regardless of whether the downlink channel is active or inactive. For example, the first set of OFDM symbols may include the sixth, seventh, thirteenth, and fourteenth OFDM symbols of the TTI.

The second set of supplemental time-frequency resources may include time-frequency resources other than the first time-frequency resources that may be used for reference signal transmission during periods of inactivity. For example, time resources corresponding to a second set of OFDM symbols may be used for reference signal transmission only when the downlink channel is inactive. The second set of OFDM symbols may correspond to legacy cell-specific reservation signal locations. For example, the second set of OFDM symbols may include the first, second, fifth, eighth, ninth, and twelfth OFDM symbols of the TTI.

In some examples, the communications manager 101 may not transmit the NB-RSs on one or more of the downlink carriers during the period of inactivity based at least in part on the minimum bandwidth criteria. For example, the communications manager 101 may not transmit the NB-RSs on a fourth downlink carrier when the first, second, and third carriers are active and satisfy the minimum bandwidth criteria.

In some examples, the communications manager 101 may boost the power of the NB-RSs transmitted during the period of inactivity. For example, the communications manager 101 may transmit the NB-RSs at a boosted power during the periods of inactivity, where the boosted power may be a multiple, e.g., six times, of the power at which NB-RSs may be transmitted during periods of activity.

UEs 115 may include a communications manager 102, which may identify a period of inactivity for a downlink channel, which may be the downlink channel over which the UE 115 may receive downlink communications from the base station 105. The communications manager 102 may receive, via a receiver/transceiver, a plurality of NB-RSs on the downlink channel during the period of inactivity. The NB-RSs may be the NB-RSs transmitted, via a transmitter/transceiver, by a communications manager 101. The communications manager 102 may determine measurement information based at least in part on the plurality of NB-RSs. The communications manager 102 may transmit, via a transmitter/transceiver, one or more measurement signals based at least in part on the determined measurement information. The measurement signals may be, for example, measurement reports.

Figure 2:
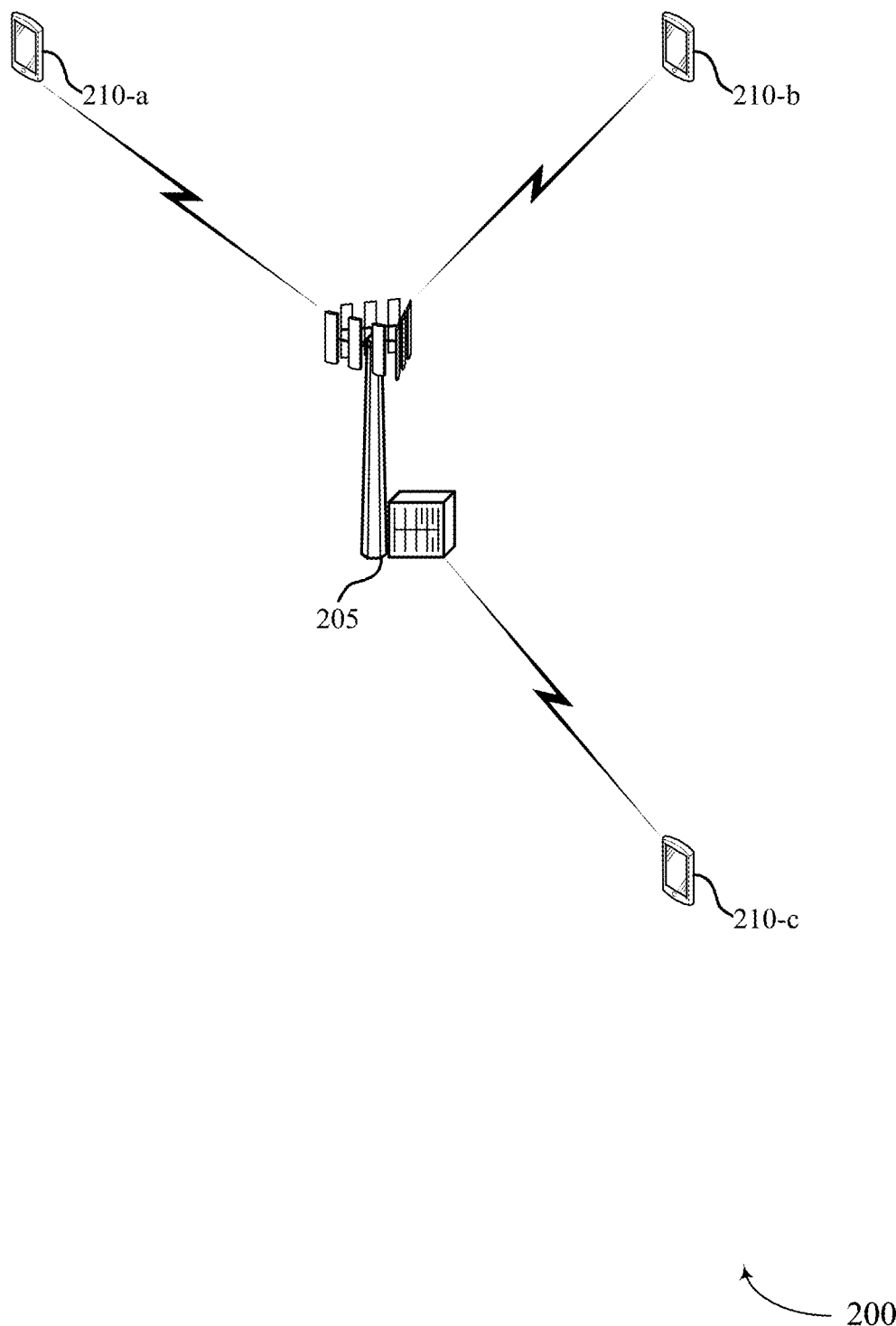
FIG. 2 illustrates an example of a wireless communications system that supports bandwidth reservation signal for base station operation in digital modulation in accordance with aspects of the present disclosure.

FIG. 2 illustrates an example of a wireless communications system 200 that supports bandwidth reservation signal for base station operation in digital modulation in accordance with various aspects of the present disclosure. In some examples, wireless communications system 200 may implement aspects of wireless communications system 100.

The wireless communications system 200 may include a base station 205 and a plurality of UEs 210. The base station 205 may be an example of aspects of base station 105 as described with reference to FIG. 1. The UEs 210 may be examples of aspects of UE 115 described with reference to FIG. 1.

The base station 205 may transmit downlink communications to one or more of the UEs 210. The base station 205 may communicate with one or more of the UEs 210 according to a frame structure including at least one downlink segment. The frame structure may be, for example, an m-frame structure. Each frame may include one or more subframes, which may include a plurality of OFDM symbols.

The base station 205 may be capable of communicating with the UEs on a number of different channels (e.g., resource bands). The base station 205 may select three of the available n channels, e.g., to satisfy a minimum bandwidth constraint such as the Federal Communications Commission (FCC) minimum bandwidth restraint for a shared spectrum, where n is an integer. In some examples, each channel may serve a UE, e.g., the three channels may serve the three UEs 210. In some other examples, the three channels may serve three sets of UEs.

The base station 205 may transmit downlink communications to the three UEs 210 during scheduled downlink transmission times (e.g., downlink segments of a frame). For example, during a first time period, the base station 205 may transmit a first downlink communication to the first UE 210-a on a first channel, a second downlink communication to the second UE 210-b on a second channel, and a third downlink communication to the third UE 210-c on a third channel.

In some other examples, the base station 205 may not have downlink communications to transmit to one or more of the UEs 210 during a scheduled downlink transmission time. For example, during a second period, the base station 205 may transmit a first downlink communication to the first UE 210-a on a first channel, but may not have any downlink communications available for transmission to the second UE 210-b or the third UE 210-c. In some examples, the lack of available downlink transmissions may cause the transmitting bandwidth of the base station 205 to go below a threshold value. In such examples, the base station 205 may transmit one or more reference signals on the second and/or third channel.

For example, the base station 205 may identify a period of inactivity for the second channel. The period of inactivity may correspond to all available time resources in a particular TTI for the second channel. The base station 205 may transmit narrowband reference signals (NB-RSs) on the second channel during the period of inactivity based at least in part on a channel reservation NB-RS pattern.

The channel reservation NB-RS pattern may include a first set of time-frequency resources associated with a baseline NB-RS pattern. The first set of time-frequency resources may include time-frequency resources reserved for transmission of NB-RSs regardless of whether the second channel is active or inactive. In some examples, the first set of time-frequency resources may correspond to a first set of OFDM symbols. For example, the first set of OFDM symbols may include a sixth OFDM symbol of a TTI, a seventh OFDM symbol of a TTI, a thirteenth OFDM symbol of a TTI, and a fourteenth OFDM symbol of a TTI.

The channel reservation NB-RS pattern may also include a second set of supplemental time-frequency resources. The second set of time-frequency resources may include time-frequency resources other than the first set of time-frequency resources which may be used for transmission of NB-RSs only when the second channel is inactive. In some examples, the second set of time-frequency resources may correspond to a second set of OFDM symbols associated with legacy cell-specific reference signals. For example, the second set of OFDM symbols may include a first OFDM symbol of a TTI, a second OFDM symbol of a TTI, a fifth OFDM symbol of a TTI, an eighth OFDM symbol of a TTI, a ninth OFDM symbol of a TTI, and a twelfth OFDM symbol of a TTI. In some examples, the number of time-frequency resources in the second set of time-frequency resources may be chosen to satisfy a criteria, e.g., a bandwidth usage criteria.

The base station 205 may transmit NB-RSs to the second UE 210-b on the second channel during the period of inactivity based at least in part on the first set of time-frequency resources and the second set of time-frequency resources. For example, when the period of inactivity covers time resources corresponding to an entire TTI, the base station 205 may transmit NB-RSs on the time resources corresponding to the first set of OFDM symbols and transmit NB-RSs on the time resources corresponding to the second set of OFDM symbols. As another example, when the period of inactivity covers time resources corresponding to a portion of the TTI, the base station 205 may transmit NB-RSs on the time resources correspond to the first set of OFDM symbols. The base station 205 may also transmit NB-RSs on the time resources corresponding to the second set of OFDM resources, but only if those time resources are in the period of inactivity. The base station 205 may not transmit NB-RSs on the time resources corresponding to the second set of OFDM resources when the second channel is active during those time resources.

In some examples, the base station 205 may boost the power of NB-RSs transmitted during periods of inactivity. For example, the base station 205 may transmit the NB-RSs using a power that is a multiple, e.g., six times, of the power used to transmit NB-RSs during periods of activity.

The second UE 210-b may receive the NB-RSs and prepare one or more measurement reports based at least in part on the NB-RSs. The second UE 210-b may transmit the one or more measurement reports to the base station 205.

Figure 3:
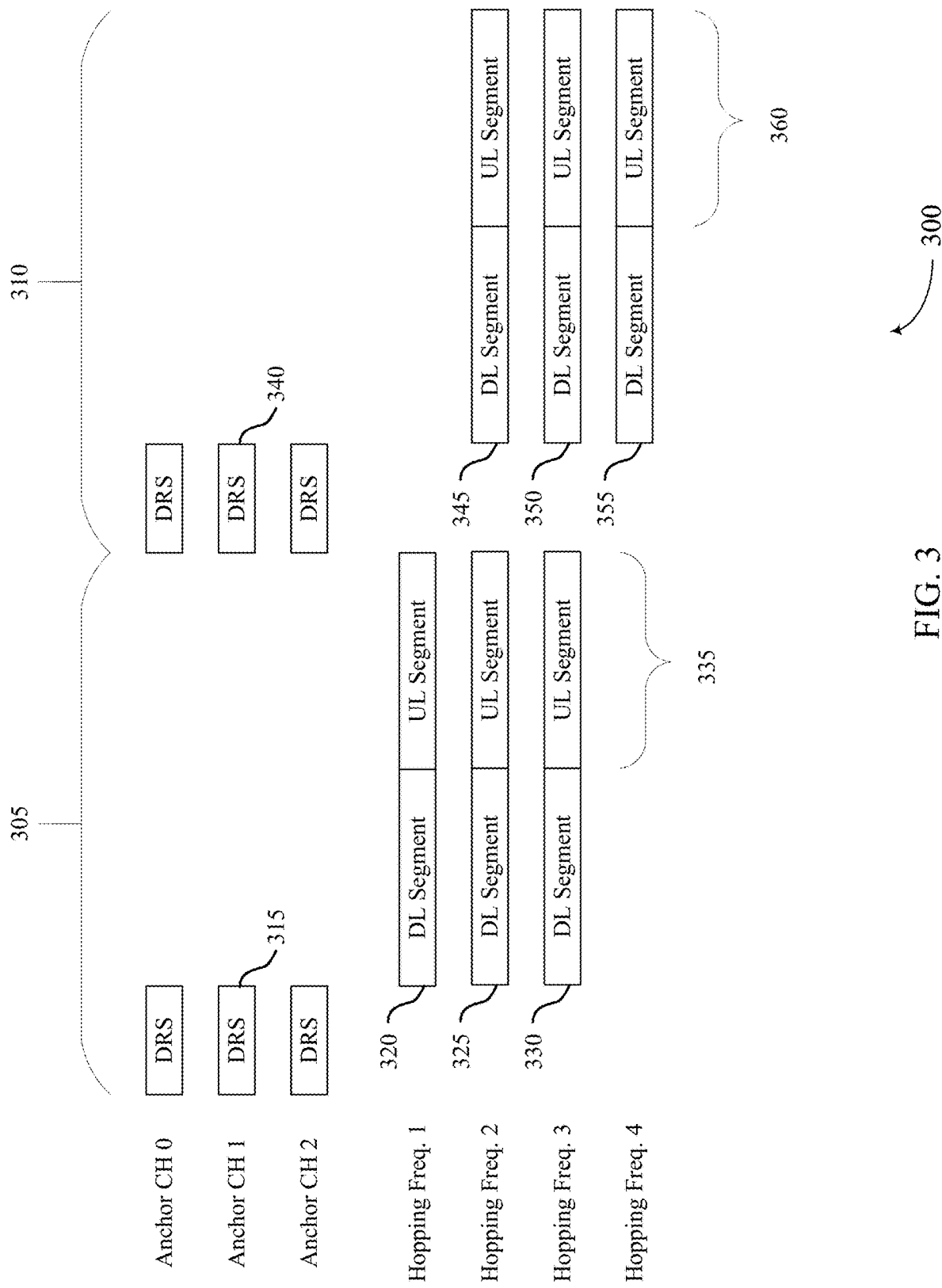
FIG. 3 illustrates an example of a communication sequence in a wireless communications system that supports bandwidth reservation signal for base station operation in digital modulation in accordance with aspects of the present disclosure.

FIG. 3 illustrates an example of a communication sequence 400 in a wireless communications system that supports nested frequency hopping for data transmission in accordance with various aspects of the present disclosure. In some examples, the wireless communications system may implement aspects of wireless communications system 100.

The communication sequence 300 may show downlink communications from a base station to a plurality of UEs, and uplink communications from the plurality of UEs to the base station. The base station and the UEs may be examples of aspects of base station 105 and UEs 115 as described with reference to FIG. 1. The communication sequence 300 includes a first frame 305 and a second frame 310. Each frame may be, for example, an m-frame. In some examples, each frame may have a standard duration such as 160 milliseconds or 320 milliseconds. Each frame may include one or more downlink segments and one or more uplink segments. The base station 105 may transmit downlink communications during the downlink segments, and may receive uplink communications during the uplink segments.

In some examples, the base station 105 may transmit downlink communications so as to satisfy a minimum bandwidth criteria. For example, the base station 105 may have a minimum bandwidth criteria of 500 kHz. Each channel (resource block) may occupy a bandwidth of 200 kHz. Accordingly, the base station 105 may select three or more channels (resource blocks) to satisfy the minimum bandwidth criteria. In some examples, the base station 105 may perform a frequency hopping procedure (e.g., a frequency hopping procedure based at least in part on a pseudorandom pattern) to select three or more channels for communications during a frame.

At the start of the first frame 305, the base station 105 may transmit a discovery reference signal (DRS) 315 on at least one anchor channel, e.g., three anchor channels or carriers. Each anchor channel may correspond to one resource block. The anchor channels may be resource blocks that are designated for transmitting a DRS and that are used exclusively or primarily for the transmission of the DRS and other control signals. The resource blocks used for the anchor channels may be known to the base station 105 and the plurality of UEs 115 before the DRS is transmitted. For example, the base station 105 may identify the anchor channels when a UE 115 joins the cell. In some examples, the DRS may have a standard duration such as 10 milliseconds or 20 milliseconds.

The base station 105 may select a first plurality of downlink carriers for the first frame 305, e.g., by using a frequency hopping procedure. The base station 105 may then transmit downlink communications on the downlink carriers during downlink segments of the first frame 305. For example, the base station 105 may select a first channel corresponding to hopping frequency 1, a second channel corresponding to hopping frequency 2, and a third channel corresponding to hopping frequency 3 as the downlink carriers for the first frame 305. The base station 105 may then transmit downlink communications to a first UE (e.g., UE 210-a of FIG. 2) on the first channel during the downlink (DL) segment 320, downlink communications to a second UE (e.g., UE 210-b of FIG. 2) on the second channel during the DL segment 325, and downlink communications to a third UE (e.g., UE 210-c of FIG. 2) on the third channel during the DL segment 330. Because the base station 105 is transmitting on each of the three channels, the base station 105 satisfies the minimum bandwidth criteria.

The UEs 115 may transmit uplink communications during the uplink (UL) segments of the first frame 305. In some examples, the UEs 115 may transmit the uplink communications over the first plurality of downlink carriers, although in some cases the UEs 115 may not use the same assignments used for the downlink carriers (e.g., a UE 115 may receive downlink communications over a first channel and transmit uplink communications over a second channel).

At the start of the second frame 310, the base station 105 may transmit a second DRS 340 on the at least one anchor channel, e.g., three anchor channels or carriers, as described above with respect to DRS 315.

The base station 105 may select a first plurality of downlink carriers for the second frame 310, e.g., by using a frequency hopping procedure. The base station 105 may then transmit downlink communications on the downlink carriers during downlink segments of the second frame 310. For example, the base station 105 may select a second channel corresponding to hopping frequency 2, a third channel corresponding to hopping frequency 3, and a fourth channel corresponding to hopping frequency 4 as the downlink carriers for the second frame 310. The base station 105 may then transmit downlink communications to a first UE on the second channel during the DL segment 345, and downlink communications to a second UE on the third channel during the DL segment 350. However, the base station 105 may not have any downlink communications to transmit to the third UE on the fourth channel during DL segment 355, or a portion thereof. In some cases, the base station 105 may not satisfy minimum bandwidth criteria if it does not transmit on one or more inactive channels.

In order to satisfy the minimum bandwidth criteria, the base station 105 may identify a period of inactivity for the fourth channel. For example, the base station 105 may identify a period of inactivity corresponding to the entirety of DL segment 355. In some other examples, the base station 105 may identify a period of inactivity corresponding to a portion of DL segment 355.

The base station 105 may transmit a plurality of narrowband reference signals (NB-RSs) on the fourth channel during the period of inactivity, e.g., DL segment 355. The base station 105 may transmit the NB-RSs during the period of inactivity based at least in part on a channel reservation NB-RS pattern. The channel reservation NB-RS pattern may include a first set of time-frequency resources associated with a baseline NB-RS pattern and a second set of supplemental time-frequency resources associated with the period of inactivity.

The first set of time-frequency resources may include time-frequency resources that are reserved for reference signals during periods of activity. For example, time resources corresponding to a first set of OFDM symbols may be used for reference signal transmission regardless of whether the downlink channel is active or inactive. For example, the first set of OFDM symbols may include the sixth, seventh, thirteenth, and fourteenth OFDM symbols of the TTI.

The second set of supplemental time-frequency resources may include time-frequency resources other than the first time-frequency resources that may be used for reference signal transmission during periods of inactivity. For example, time resources corresponding to a second set of OFDM symbols may be used for reference signal transmission only when the fourth channel is inactive. The second set of OFDM symbols may correspond to legacy cell-specific reservation signal locations. For example, the second set of OFDM symbols may include the first, second, fifth, eighth, ninth, and twelfth OFDM symbols of the TTI.

The base station 105 may transmit a first set of NB-RSs based at least in part on the first set of time-frequency resources and a second set of NB-RSs based at least in part on the second set of supplemental time-frequency resources. For example, the NB-RSs may be repeated on legacy cell specific reference signal (CRS) locations on first, second, fifth, eighth, ninth, and twelfth OFDM symbols. Where the period of inactivity covers only a portion of the DL segment 355, the base station 105 may transmit NB-RSs during the time resources corresponding to the first set of OFDM symbols throughout the DL segment 355, and may transmit NB-RSs during the time resources corresponding to the second set of OFDM symbols only during the portion of the DL segment 355 corresponding to the period of inactivity.

In some examples, the base station 105 may boost the power of the NB-RSs transmitted during the period of inactivity. For example, the base station 105 may transmit the NB-RSs transmitted during the period of inactivity at a boosted power. The boosted power level may be a power that is a multiple, e.g., six times, of the power used to transmit the NB-RSs during periods of activity. In some examples, power boosting may be needed as the NB-RSs only occupy 1 out of 6 tones per antenna port.

The third UE 115 may also determine the period of inactivity, e.g., the DL segment 355. The third UE 115 may receive the NB-RSs during the period of inactivity. The third UE 115 may determine measurement information based at least in part on the NB-RSs received during the period of inactivity. The third UE 115 may transmit one or more measurements reports to the base station 105 based at least in part on the measurement information.

The UEs 115 may transmit uplink communications during the UL segments 360 of the second frame 310, as described above with reference to UL segments 335 of the first frame 305.

Figure 4:
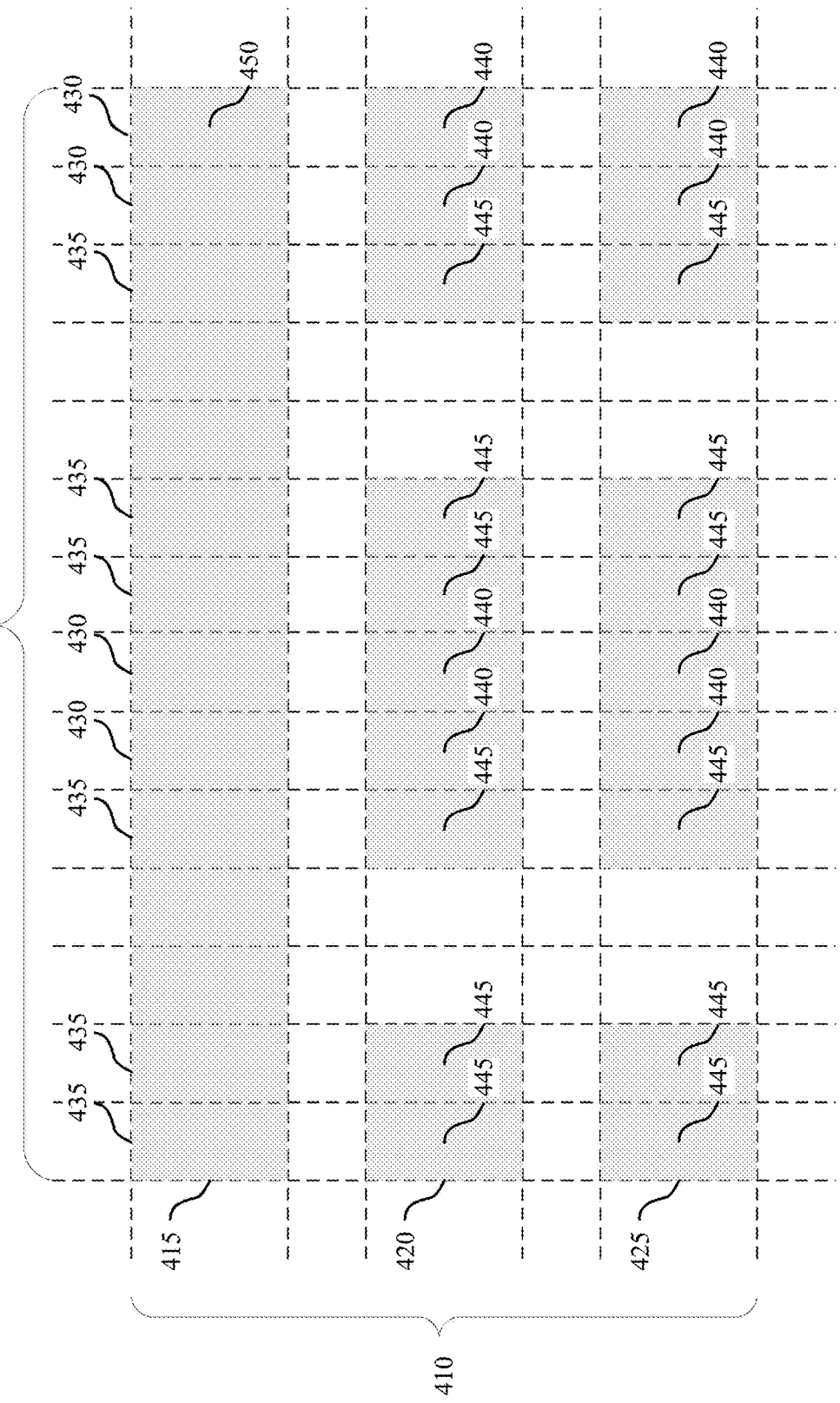
FIG. 4 illustrates an example of a communication sequence in a wireless communications system that supports bandwidth reservation signal for base station operation in digital modulation in accordance with aspects of the present disclosure.

FIG. 4 illustrates an example of a communication sequence 400 in a wireless communications system that supports bandwidth reservation signal for base station operation in digital modulation in accordance with various aspects of the present disclosure. In some examples, the wireless communications system may implement aspects of wireless communications system 100.

The communication sequence 400 may show downlink communications from a base station to one or more UEs. The base station may be an example of aspects of base station 105 described with reference to FIG. 1. The one or more UEs may be examples of aspects of UE 115 described with reference to FIG. 1.

The communication sequence 400 may correspond to a TTI. The TTI may be a downlink TTI, i.e., a TTI during a time period allocated for downlink communications from a base station 105 to one or more UEs 115. For example, the TTI may be a sub-unit of a frame including one or more downlink segments and one or more uplink segments. The TTI may be a component of the one or more downlink segments. For example, the TTI may be a sub-frame.

A plurality of time-frequency resources may be available for downlink communications during the communication sequence 400. Each of the plurality of time-frequency resources may include a combination of a time resource 405 and a frequency resource 410. In some examples, each of the time resources 405 may correspond to an OFDM symbol. For example, the TTI may be a sub-frame consisting of fourteen OFDM symbols.

The frequency resources 410 may include a plurality of channels at different frequencies. For example, a plurality of channels may be reserved for communications between a base station 105 and one or more UEs 115 during the communication sequence 400. The number of channels may be determined based at least in part on bandwidth constraints (e.g., FCC bandwidth constraints). For example, during the communication sequence 400, three channels may be reserved for communications between a base station 105 and three UEs 115. In other examples, the three channels may be reserved for communications between a base station 105 and three sets of UEs 115. In some examples, a larger or smaller number of channels may be reserved for communications between the base station 105 and associated UEs 115.

The plurality of channels reserved for communications between the base station 105 and the UEs 115 may include a first channel 415, a second channel 420, and a third channel 425. The base station 105 may transmit downlink communications for a first UE (UE0) on the first channel 415, downlink communications for a second UE (UE1) on the second channel 420, and downlink communications for a third UE (UE2) on the third channel 425.

In some examples, the base station 105 may not have downlink communications available for transmission to one or more UEs during a TTI. The base station 105 may identify a period of inactivity for each downlink channel. For example, the base station 105 may be scheduled to actively transmit downlink communications to the first UE during the TTI, but may not be scheduled to transmit downlink communications to either the second UE on the second channel 420 or the third UE on the third channel 425. The base station 105 may identify all time resources 405 as the period of inactivity for the second channel 420 and the third channel 425. In some other examples, the base station 105 may determine that there are no downlink communications to transmit on a particular downlink channel during a portion of the time resources 405 corresponding to the TTI, and may identify only that portion of the time resources 405 as the period of inactivity.

The base station 105 may transmit one or more reference signals on the second channel 420 and the third channel 425 during the periods of inactivity for the second channel 420 and the third channel 425. The reference signals may be, for example, narrowband reference signals (NB-RSs).

The NB-RSs may be transmitted based at least in part on a channel reservation NB-RS pattern. The channel reservation NB-RS pattern may include a first set of time-frequency resources associated with a baseline NB-RS pattern and a second set of supplemental time-frequency resources associated with a period of inactivity.

The first set of time-frequency resources may include time-frequency resources that are reserved for reference signals during periods of activity. For example, time resources 405 corresponding to a first set of OFDM symbols 430 may be used for reference signal transmission regardless of whether the downlink channel is active or inactive. For example, the first set of OFDM symbols 430 may include the sixth, seventh, thirteenth, and fourteenth OFDM symbols of the TTI.

The second set of supplemental time-frequency resources may include time-frequency resources other than the first time-frequency resources that may be used for reference signal transmission during periods of inactivity. For example, time resources corresponding to a second set of OFDM symbols 435 may be used for reference signal transmission only when the downlink channel is inactive. The second set of OFDM symbols 435 may correspond to legacy cell-specific reservation signal locations. For example, the second set of OFDM symbols 435 may include the first, second, fifth, eighth, ninth, and twelfth OFDM symbols of the TTI.

The base station 105 may transmit NB-RSs on downlink channels during the identified periods of inactivity. For example, the base station 105 may transmit a first set of NB-RSs 440 based as least in part on the first set of time-frequency resources and a second set of NB-RSs 445 based at least in part on the second set of supplemental time-frequency resources. In some examples, the period of inactivity may cover all time resources 405, and the base station 105 may transmit NB-RSs 440 and 445 during all time resources 405 corresponding to the first set of OFDM symbols 430 and the second set of OFDM symbols 435. In some other examples, the period of inactivity may cover only a portion of time resources 405, and the base station 105 may transmit NB-RSs 440 during the time resources 405 corresponding to the first set of OFDM symbols 430, and may transmit NB-RSs 445 during the time resources 405 corresponding to the second set of OFDM symbols 435 unless the downlink channel is active at those times.

The base station 105 may transmit downlink data 450 on active channels (e.g., on the first channel 415 on which downlink communications are scheduled during the TTI). The transmission of downlink data 450 may include transmission of NB-RSs during the time resources 405 corresponding to the first set of OFDM symbols 430. NB-RSs may not be transmitted during the time resources 405 corresponding to the second set of OFDM symbols 435 on the active channel.

Figure 5:
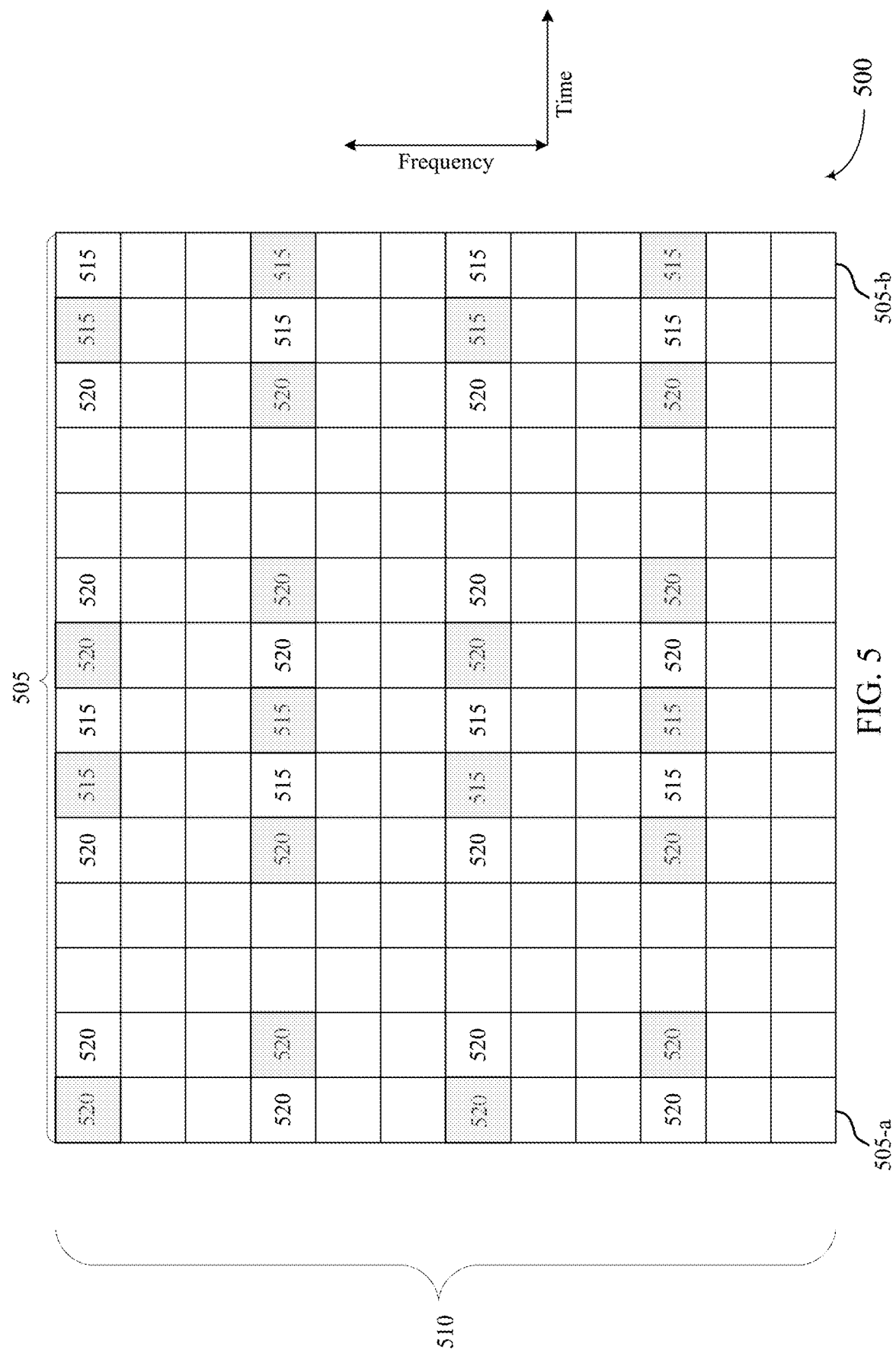
FIG. 5 illustrates an example of a channel reservation pattern that supports bandwidth reservation signal for base station operation in digital modulation in accordance with aspects of the present disclosure.

FIG. 5 illustrates an example of a channel reservation NB-RS pattern 500 for use in a wireless communications system that supports bandwidth reservation signal for base station operation in digital modulation in accordance with various aspects of the present disclosure. In some examples, the wireless communications system may implement aspects of wireless communications system 100.

The channel reservation NB-RS pattern 500 shows a pattern for NB-RSs for a combination of time resources 505 and frequency resources 510. The time resources 505 may correspond to OFDM symbols of a TTI, i.e., time resource 505-*a* corresponds to a first OFDM symbol of the TTI and time resource 505-*b* corresponds to a fourteenth OFDM symbol of the TTI. The frequency resources may correspond to OFDM frequency tones.

The channel reservation NB-RS pattern 500 may include a first set of time-frequency resources 515 and a second set of time-frequency resources 520. The first set of time-frequency resources 515 may be associated with a baseline NB-RS pattern. For example, the first set of time-frequency resources 515 may be used for reference signal transmission regardless of whether the downlink is active or inactive. The first set of time-frequency resources 515 may correspond to the sixth, seventh, thirteenth, and fourteenth OFDM symbols of the TTI.

The second set of time-frequency resources 520 may be a supplemental set of time-frequency resources. The second set of time-frequency resources 520 may include time-frequency resources other than the first time-frequency resources 515 that may be used for reference signal transmission during periods of inactivity. For example, the second set of time-frequency resources 520 may be used for reference signal transmission only when the downlink channel is inactive. In some examples, the second set of time-frequency resources 520 may correspond to legacy cell-specific reference signal locations. For example, the second set of time-frequency resources 520 may correspond to the first, second, fifth, eighth, ninth, and twelfth OFDM symbols of the TTI. The number of time-frequency resources in the second set of time-frequency resources 520 may be selected to meet certain transmission criteria, e.g., minimum bandwidth criteria such as FCC minimum bandwidth criteria.

In some examples, the channel reservation NB-RS pattern 500 may include antenna port information. For example, the shaded time-frequency resources may correspond to a first antenna port (Port 0) and the unshaded time-frequency resources may correspond to a second antenna port (Port 1). The base station 105 may transmit the NB-RSs based at least in part on the antenna port information.

In some examples, the base station 105 may perform power boost operation to boost the power of NB-RSs transmitted during a period of inactivity. The power boost operation may include transmitting the NB-RSs at an increased power in comparison to the baseline power used during periods of activity for transmission of the NB-RSs. For example, each NB-RS may occupy only one of the six available tones per antenna port. Accordingly, the base station 105 may transmit the NB-RSs at a power that is a multiple, e.g., six times, of the baseline power during periods of inactivity.

Figure 6:
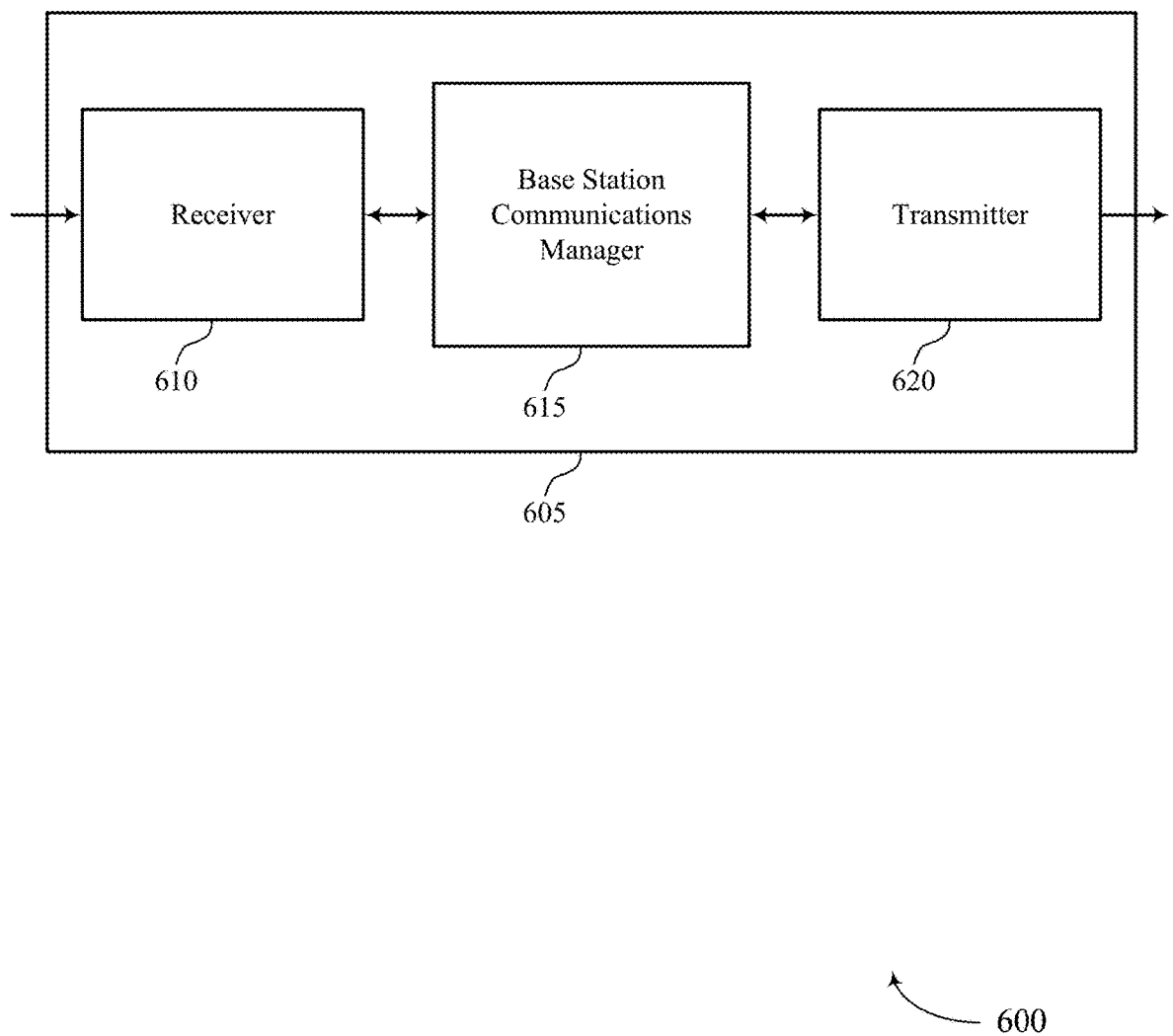
FIGS. 6 through 8 show block diagrams of a device that supports bandwidth reservation signal for base station operation in digital modulation in accordance with aspects of the present disclosure.

FIG. 6 shows a block diagram 600 of a wireless device 605 that supports bandwidth reservation signal for base station operation in digital modulation in accordance with aspects of the present disclosure. Wireless device 605 may be an example of aspects of a base station 105 as described herein. Wireless device 605 may include receiver 610, base station communications manager 615, and transmitter 620.

Wireless device 605 may also include a processor. Each of these components may be in communication with one another (e.g., via one or more buses).

Receiver 610 may receive information such as packets, user data, or control information associated with various information channels (e.g., control channels, data channels, and information related to bandwidth reservation signal for base station operation in digital modulation, etc.). Information may be passed on to other components of the device 605. The receiver 610 may be an example of aspects of the transceiver 935 described with reference to FIG. 9. The receiver 610 may utilize a single antenna or a set of antennas.

Base station communications manager 615 may be an example of aspects of the base station communications manager 915 described with reference to FIG. 9.

Base station communications manager 615 and/or at least some of its various sub-components may be implemented in hardware, software executed by a processor, firmware, or any combination thereof. If implemented in software executed by a processor, the functions of the base station communications manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The base station communications manager 615 and/or at least some of its various sub-components may be physically located at various positions, including being distributed such that portions of functions are implemented at different physical locations by one or more physical devices. In some examples, base station communications manager 615 and/or at least some of its various sub-components may be a separate and distinct component in accordance with various aspects of the present disclosure. In other examples, base station communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 615 may identify, by a wireless device, a set of downlink carriers for a transmission time interval (TTI), identify a period of inactivity for one or more downlink carriers of the set of downlink carriers during the TTI, and transmit narrowband reference signals (NB-RSs) over the one or more downlink carriers during the period of inactivity according to a channel reservation narrowband reference signal (NB-RS) pattern, the channel reservation NB-RS pattern including a first set of time-frequency resources associated with a baseline NB-RS pattern and a second set of supplemental time-frequency resources associated with the period of inactivity.

Transmitter 620 may transmit signals generated by other components of the device 605. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
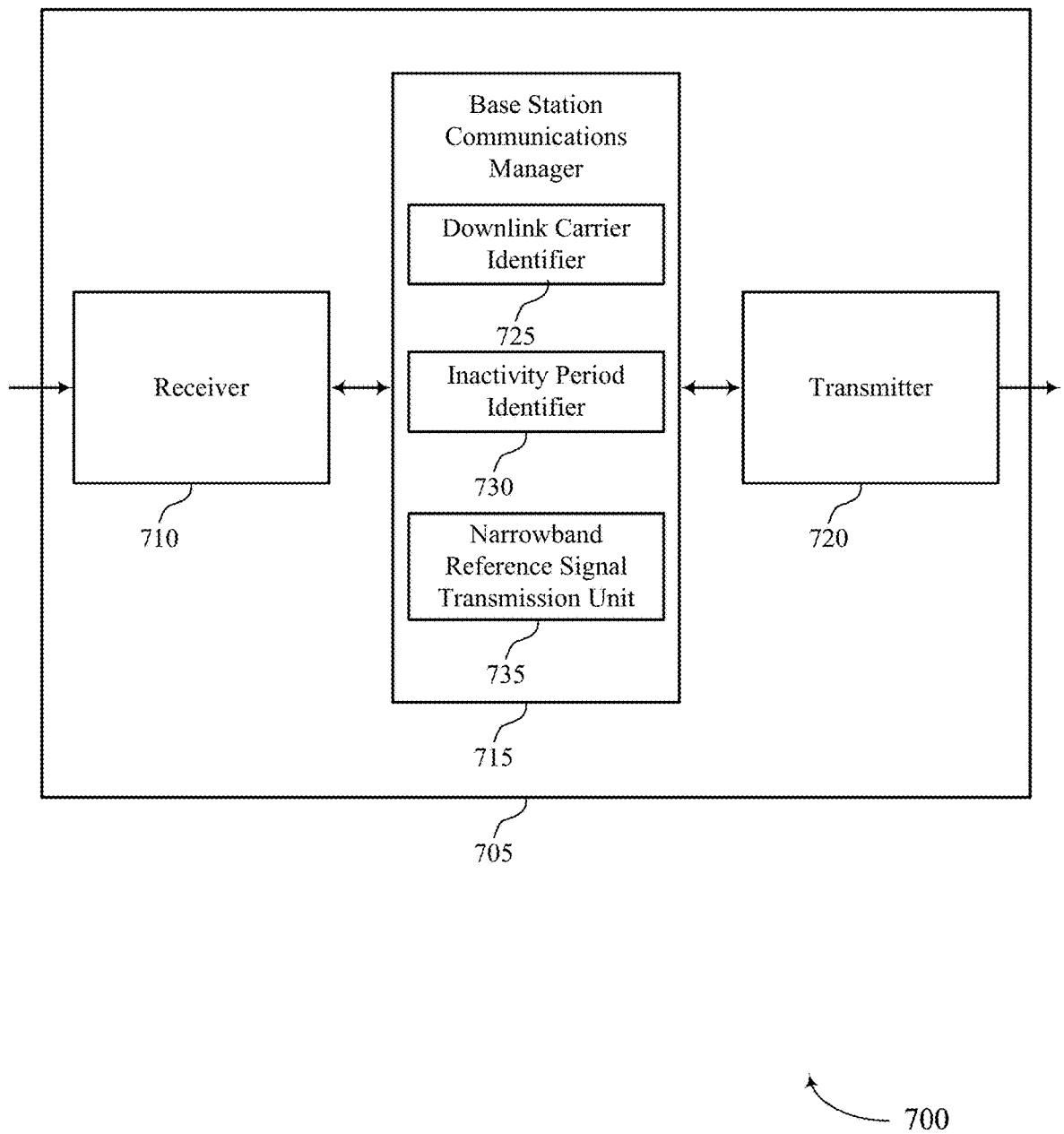

FIG. 7 shows a block diagram 700 of a wireless device 705 that supports bandwidth reservation signal for base station operation in digital modulation in accordance with aspects of the present disclosure. Wireless device 705 may be an example of aspects of a wireless device 605 or a base station 105 as described with reference to FIG. 6. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to bandwidth reservation signal for base station operation in digital modulation, etc.). Information may be passed on to other components of the device 705. The receiver 710 may be an example of aspects of the transceiver 935 described with reference to FIG. 9. The receiver 710 may utilize a single antenna or a set of antennas.

Base station communications manager 715 may be an example of aspects of the base station communications manager 915 described with reference to FIG. 9.

Base station communications manager 715 may also include downlink carrier identifier 725, inactivity period identifier 730, and narrowband reference signal transmission unit 735.

Downlink carrier identifier 725 may identify, by a wireless device, a set of downlink carriers for a TTI.

Inactivity period identifier 730 may identify a period of inactivity for one or more downlink carriers of the set of downlink carriers during the TTI.

Narrowband reference signal transmission unit 735 may transmit narrowband reference signals (NB-RSs) over the one or more downlink carriers during the period of inactivity according to a channel reservation narrowband reference signal (NB-RS) pattern, the channel reservation NB-RS pattern including a first set of time-frequency resources associated with a baseline NB-RS pattern and a second set of supplemental time-frequency resources associated with the period of inactivity.

Transmitter 720 may transmit signals generated by other components of the device 705. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
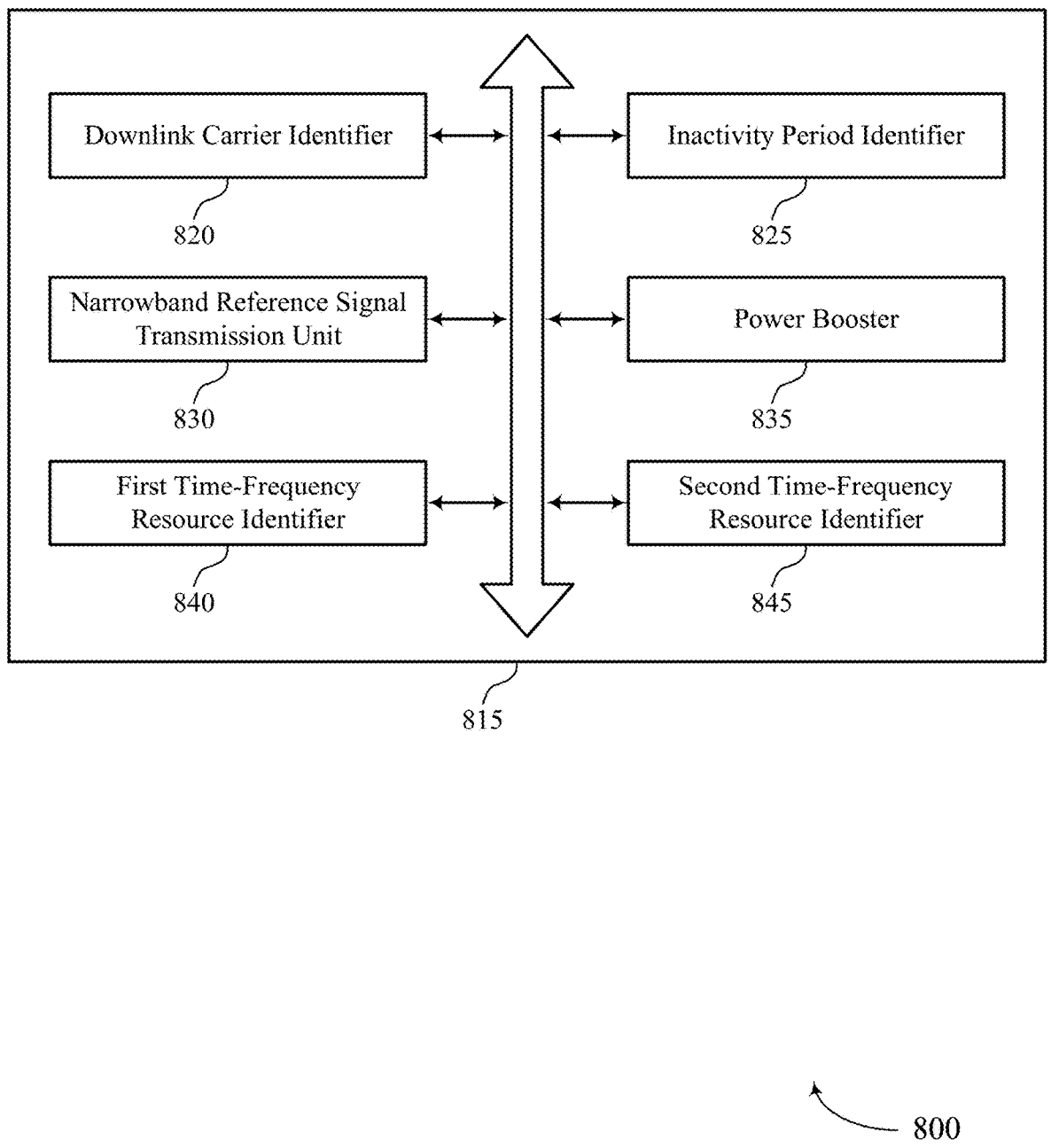

FIG. 8 shows a block diagram 800 of a base station communications manager 815 that supports bandwidth reservation signal for base station operation in digital modulation in accordance with aspects of the present disclosure. The base station communications manager 815 may be an example of aspects of a base station communications manager 615, a base station communications manager 715, or a base station communications manager 915 described with reference to FIGS. 6, 7, and 9. The base station communications manager 815 may include downlink carrier identifier 820, inactivity period identifier 825, narrowband reference signal transmission unit 830, power booster 835, first time-frequency resource identifier 840, and second time-frequency resource identifier 845. Each of these modules may communicate, directly or indirectly, with one another (e.g., via one or more buses).

Downlink carrier identifier 820 may identify, by a wireless device, a set of downlink carriers for a TTI.

Inactivity period identifier 825 may identify a period of inactivity for one or more downlink carriers of the set of downlink carriers during the TTI.

Narrowband reference signal transmission unit 830 may transmit narrowband reference signals (NB-RSs) over the one or more downlink carriers during the period of inactivity according to a channel reservation narrowband reference signal (NB-RS) pattern, the channel reservation NB-RS pattern including a first set of time-frequency resources associated with a baseline NB-RS pattern and a second set of supplemental time-frequency resources associated with the period of inactivity.

Power booster 835 may boost a power of the NB-RSs transmitted during the period of inactivity and transmit the NB-RSs using the boosted power, where the boosted power is a multiple, e.g., six times, of a baseline power associated with reference signal transmission during periods of activity.

First time-frequency resource identifier 840 may identify the first set of time-frequency resources to be included in the channel reservation NB-RS pattern. In some cases, the first set of time-frequency resources includes a first set orthogonal frequency division multiplexing (OFDM) symbols. In some cases, the first set of OFDM symbols includes a sixth OFDM symbol of the TTI, a seventh OFDM symbol of the TTI, a thirteenth OFDM symbol of the TTI, and a fourteenth OFDM symbol of the TTI.

Second time-frequency resource identifier 845 may identify the second set of time-frequency resources to be included in the channel reservation NB-RS pattern. In some cases, the second set of time-frequency resources includes a second set of OFDM symbols. In some cases, the second set of OFDM symbols includes a first OFDM symbol of the TTI, a second OFDM symbol of the TTI, a fifth OFDM symbol of the TTI, an eighth OFDM symbol of the TTI, a ninth OFDM symbol of the TTI, and a twelfth OFDM symbol of the TTI. In some cases, the second set of time-frequency resources includes time-frequency resources associated with cell-specific reference signals.

Figure 9:
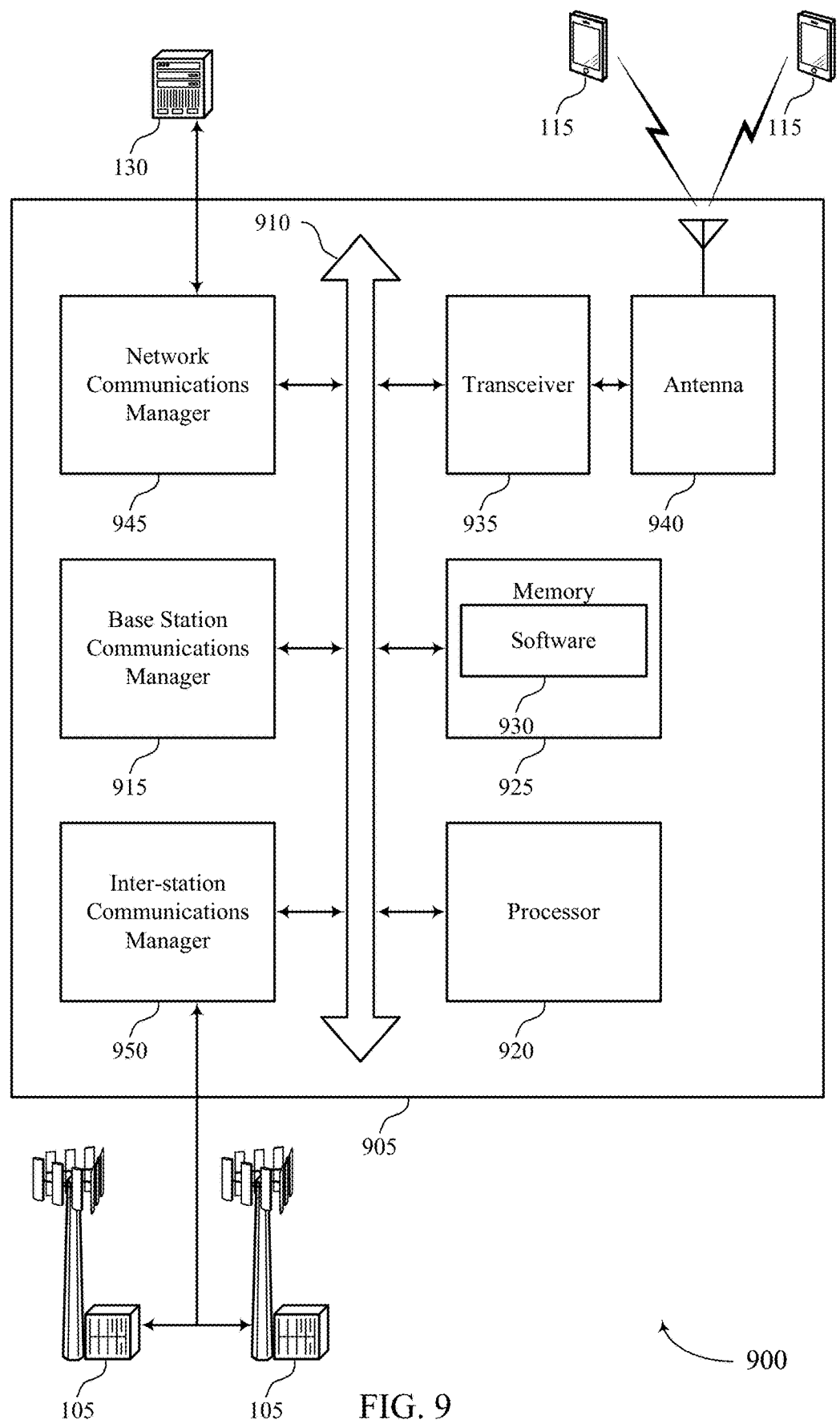
FIG. 9 illustrates a block diagram of a system including a base station that supports bandwidth reservation signal for base station operation in digital modulation in accordance with aspects of the present disclosure.

FIG. 9 shows a diagram of a system 900 including a device 905 that supports bandwidth reservation signal for base station operation in digital modulation in accordance with aspects of the present disclosure. Device 905 may be an example of or include the components of wireless device 605, wireless device 705, or a base station 105 as described above, e.g., with reference to FIGS. 6 and 7. Device 905 may include components for bi-directional voice and data communications including components for transmitting and receiving communications, including base station communications manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more user equipment (UE)s 115.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting bandwidth reservation signal for base station operation in digital modulation).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support bandwidth reservation signal for base station operation in digital modulation. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device 905 may include a single antenna 940. However, in some cases the device 905 may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within an Long Term Evolution (LTE)/LTE-A wireless communication network technology to provide communication between base stations 105.

Figure 10:
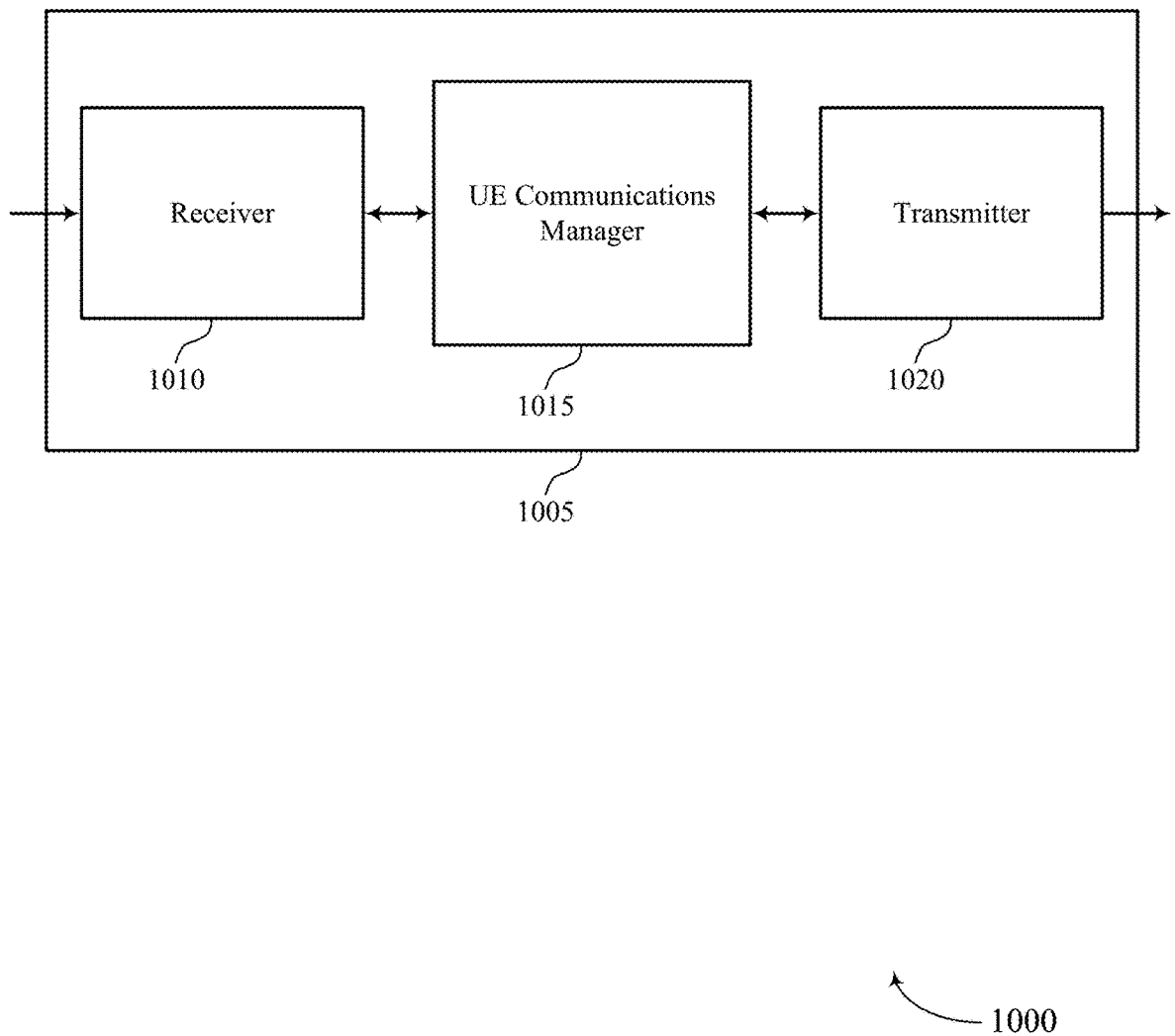
FIGS. 10 through 12 show block diagrams of a device that supports bandwidth reservation signal for base station operation in digital modulation in accordance with aspects of the present disclosure.

FIG. 10 shows a block diagram 1000 of a wireless device 1005 that supports bandwidth reservation signal for base station operation in digital modulation in accordance with aspects of the present disclosure. Wireless device 1005 may be an example of aspects of a UE 115 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to bandwidth reservation signal for base station operation in digital modulation, etc.). Information may be passed on to other components of the device 1005. The receiver 1010 may be an example of aspects of the transceiver 1335 described with reference to FIG. 13. The receiver 1010 may utilize a single antenna or a set of antennas.

UE communications manager 1015 may be an example of aspects of the UE communications manager 1315 described with reference to FIG. 13.

UE communications manager 1015 and/or at least some of its various sub-components may be implemented in hardware, software executed by a processor, firmware, or any combination thereof. If implemented in software executed by a processor, the functions of the UE communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1015 may determine, by a wireless device, a period of inactivity for a downlink channel during a TTI, receive a set of narrowband reference signals (NB-RSs) on the downlink channel during the period of inactivity, where the set of reference signals are received according to a channel reservation narrowband reference signal (NB-RS) pattern, the channel reservation NB-RS pattern including a first set of time-frequency resources associated with a baseline NB-RS pattern and a second set of supplemental time-frequency resources associated with the period of inactivity, and transmit one or more measurement signals based on the set of NB-RSs.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
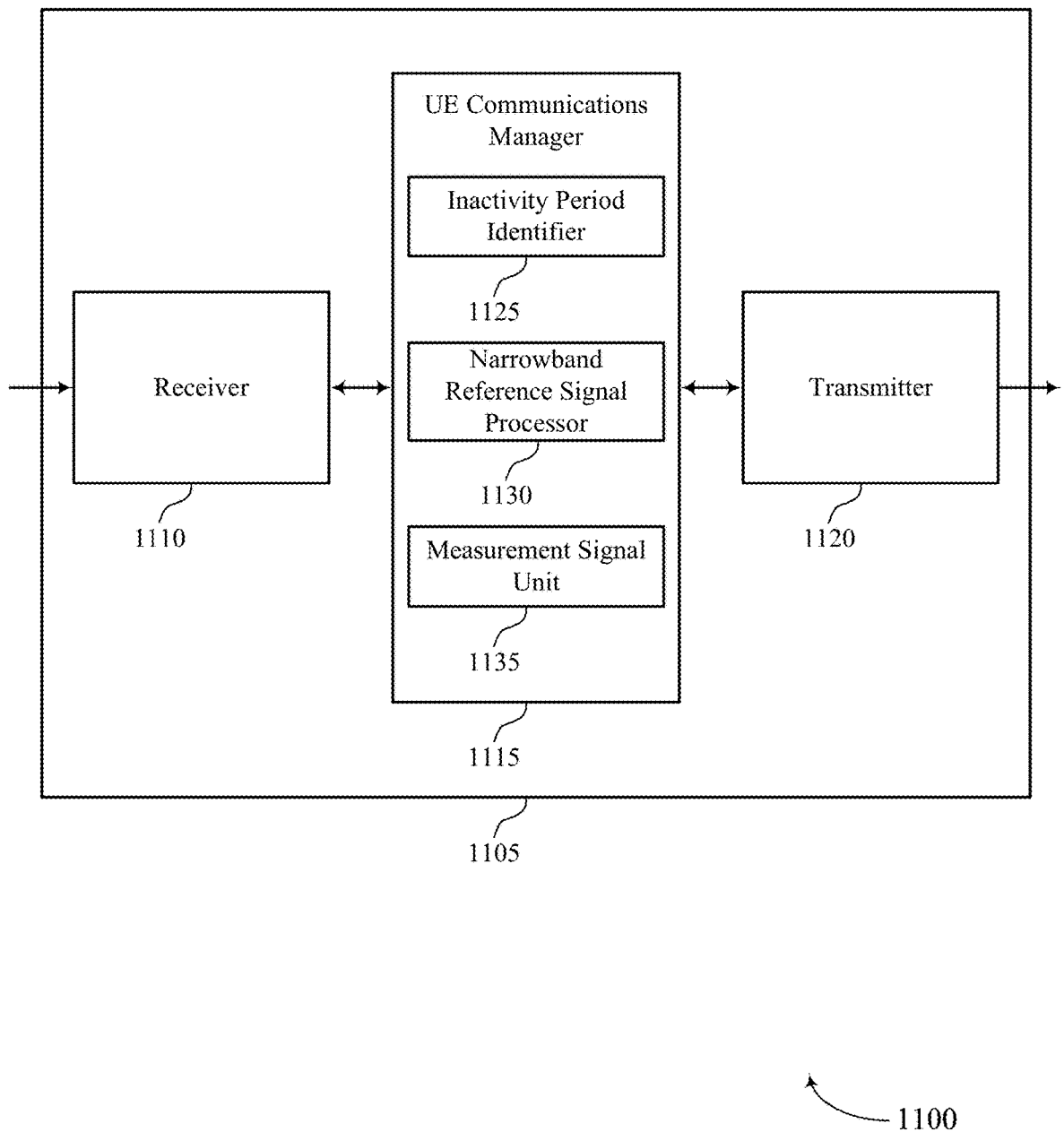

FIG. 11 shows a block diagram 1100 of a wireless device 1105 that supports bandwidth reservation signal for base station operation in digital modulation in accordance with aspects of the present disclosure. Wireless device 1105 may be an example of aspects of a wireless device 1005 or a UE 115 as described with reference to FIG. 10. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to bandwidth reservation signal for base station operation in digital modulation, etc.). Information may be passed on to other components of the device. The receiver 1110 may be an example of aspects of the transceiver 1335 described with reference to FIG. 13. The receiver 1110 may utilize a single antenna or a set of antennas.

UE communications manager 1115 may be an example of aspects of the UE communications manager 1315 described with reference to FIG. 13.

UE communications manager 1115 may also include inactivity period identifier 1125, narrowband reference signal processor 1130, and measurement signal unit 1135.

Inactivity period identifier 1125 may determine, by a wireless device, a period of inactivity for a downlink channel during a TTI.

Narrowband reference signal processor 1130 may receive a set of narrowband reference signals (NB-RSs) on the downlink channel during the period of inactivity, where the set of reference signals are received according to a channel reservation narrowband reference signal (NB-RS) pattern, the channel reservation NB-RS pattern including a first set of time-frequency resources associated with a baseline NB-RS pattern and a second set of supplemental time-frequency resources associated with the period of inactivity. In some cases, the first set of time-frequency resources includes a first set of orthogonal frequency division multiplexing (OFDM) symbols. In some cases, the second set of time-frequency resources includes a second OFDM symbols. In some cases, the first set of OFDM symbols includes a sixth OFDM symbol of the TTI, a seventh OFDM symbol of the TTI, a thirteenth OFDM symbol of the TTI, and a fourteenth OFDM symbol of the TTI. In some cases, the second set of OFDM symbols includes a first OFDM symbol of the TTI, a second OFDM symbol of the TTI, a fifth OFDM symbol of the TTI, an eighth OFDM symbol of the TTI, a ninth OFDM symbol of the TTI, and a twelfth OFDM symbol of the TTI. In some cases, the second set of time-frequency resources includes time-frequency resources associated with cell-specific resource signals.

Measurement signal unit 1135 may transmit one or more measurement signals based on the set of NB-RSs.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
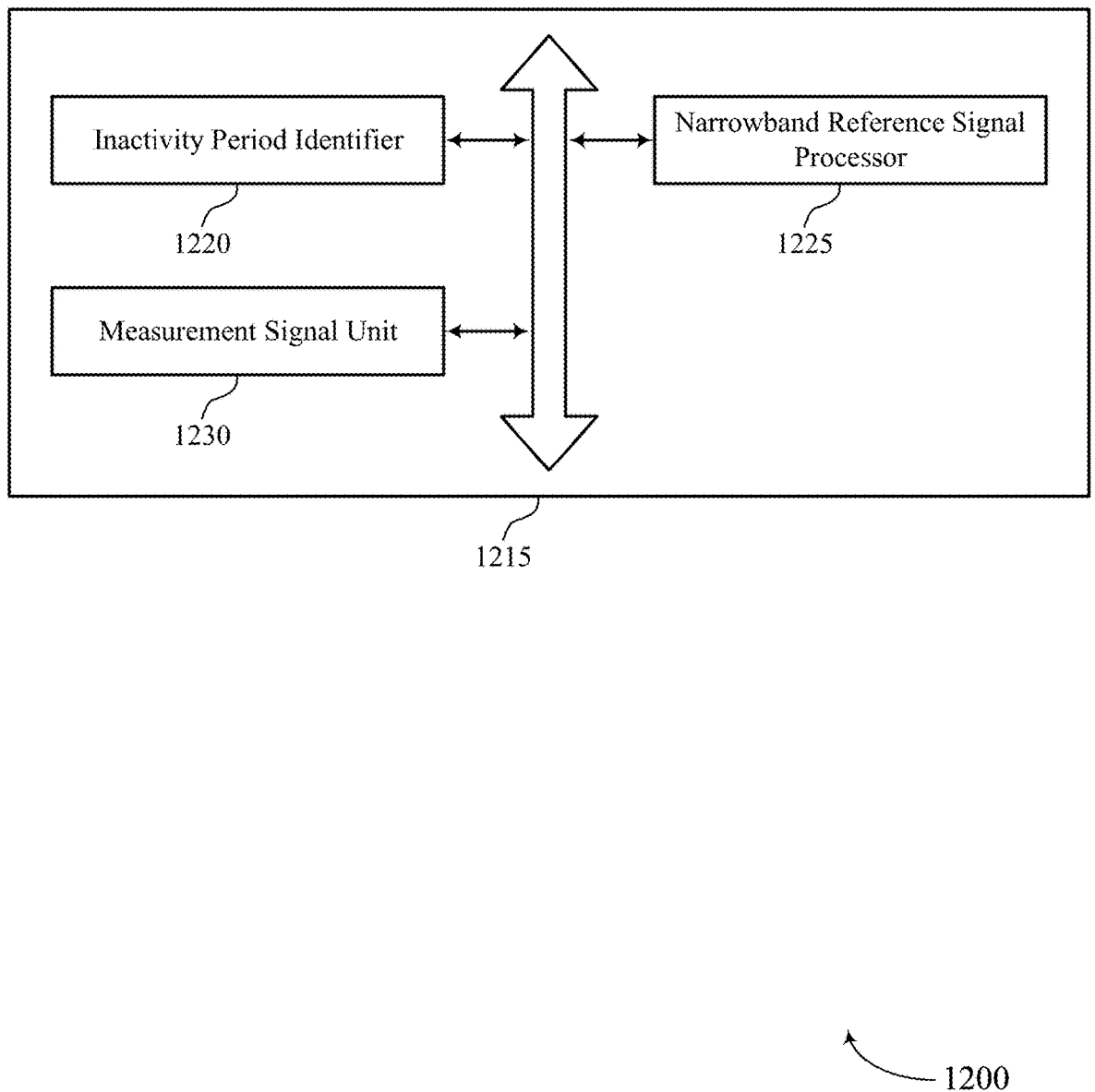

FIG. 12 shows a block diagram 1200 of a UE communications manager 1215 that supports bandwidth reservation signal for base station operation in digital modulation in accordance with aspects of the present disclosure. The UE communications manager 1215 may be an example of aspects of a UE communications manager 1315 described with reference to FIGS. 10, 11, and 13. The UE communications manager 1215 may include inactivity period identifier 1220, narrowband reference signal processor 1225, and measurement signal unit 1230. Each of these modules may communicate, directly or indirectly, with one another (e.g., via one or more buses).

Inactivity period identifier 1220 may determine, by a wireless device, a period of inactivity for a downlink channel during a TTI.

Narrowband reference signal processor 1225 may receive a set of narrowband reference signals (NB-RSs) on the downlink channel during the period of inactivity, where the set of reference signals are received according to a channel reservation narrowband reference signal (NB-RS) pattern, the channel reservation NB-RS pattern including a first set of time-frequency resources associated with a baseline NB- RS pattern and a second set of supplemental time-frequency resources associated with the period of inactivity. In some cases, the first set of time-frequency resources includes a first set of orthogonal frequency division multiplexing (OFDM) symbols. In some cases, the second set of time-frequency resources includes a second OFDM symbols. In some cases, the first set of OFDM symbols includes a sixth OFDM symbol of the TTI, a seventh OFDM symbol of the TTI, a thirteenth OFDM symbol of the TTI, and a fourteenth OFDM symbol of the TTI. In some cases, the second set of OFDM symbols includes a first OFDM symbol of the TTI, a second OFDM symbol of the TTI, a fifth OFDM symbol of the TTI, an eighth OFDM symbol of the TTI, a ninth OFDM symbol of the TTI, and a twelfth OFDM symbol of the TTI. In some cases, the second set of time-frequency resources includes time-frequency resources associated with cell-specific resource signals.

Measurement signal unit 1230 may transmit one or more measurement signals based on the set of NB-RSs.

Figure 13:
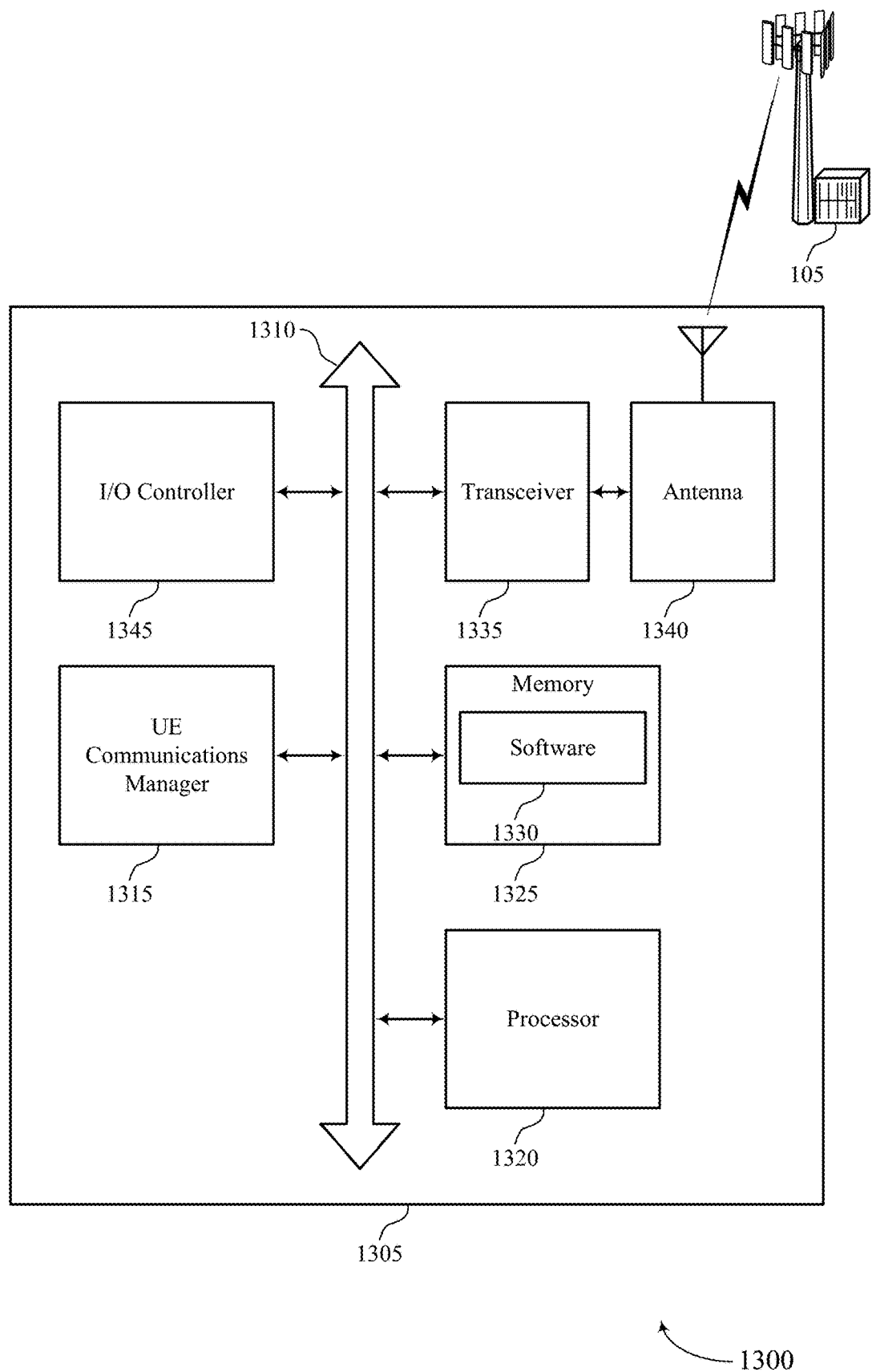
FIG. 13 illustrates a block diagram of a system including a UE that supports bandwidth reservation signal for base station operation in digital modulation in accordance with aspects of the present disclosure.

FIG. 13 shows a diagram of a system 1300 including a device 1305 that supports bandwidth reservation signal for base station operation in digital modulation in accordance with aspects of the present disclosure. Device 1305 may be an example of or include the components of UE 115 as described above, e.g., with reference to FIG. 1. Device 1305 may include components for bi-directional voice and data communications including components for transmitting and receiving communications, including UE communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting bandwidth reservation signal for base station operation in digital modulation).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support bandwidth reservation signal for base station operation in digital modulation. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device 1305 may include a single antenna 1340. However, in some cases the device 1305 may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
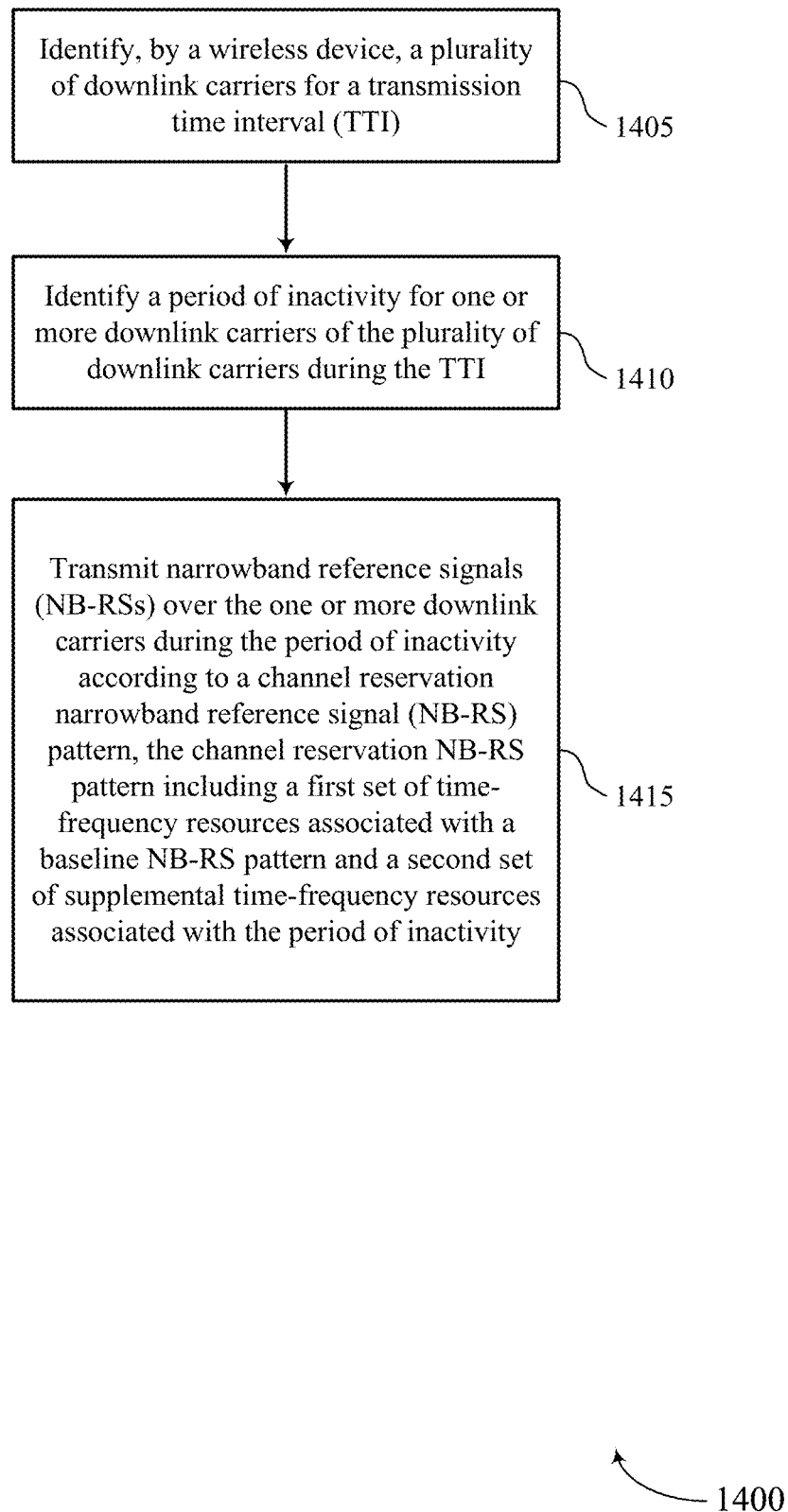
FIGS. 14 through 15 illustrate methods for bandwidth reservation signal for base station operation in digital modulation in accordance with aspects of the present disclosure.

FIG. 14 shows a flowchart illustrating a method 1400 for bandwidth reservation signal for base station operation in digital modulation in accordance with aspects of the present disclosure. The operations of method 1400 may be implemented by a base station 105 or its components as described herein. For example, the operations of method 1400 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At 1405, the base station 105 may identify a plurality of downlink carriers for a transmission time interval (TTI). The operations of 1405 may be performed according to the methods described herein. In certain examples, aspects of the operations of 1405 may be performed by a downlink carrier identifier as described with reference to FIGS. 6 through 9.

At 1410, the base station 105 may identify a period of inactivity for one or more downlink carriers of the plurality of downlink carriers during the TTI. The operations of 1410 may be performed according to the methods described herein. In certain examples, aspects of the operations of 1410 may be performed by a inactivity period identifier as described with reference to FIGS. 6 through 9.

At 1415, the base station 105 may transmit narrowband reference signals (NB-RSs) over the one or more downlink carriers during the period of inactivity according to a channel reservation narrowband reference signal (NB-RS) pattern, the channel reservation NB-RS pattern including a first set of time-frequency resources associated with a baseline NB-RS pattern and a second set of supplemental time-frequency resources associated with the period of inactivity. The operations of 1415 may be performed according to the methods described herein. In certain examples, aspects of the operations of 1415 may be performed by a narrowband reference signal transmission unit as described with reference to FIGS. 6 through 9.

Figure 15:
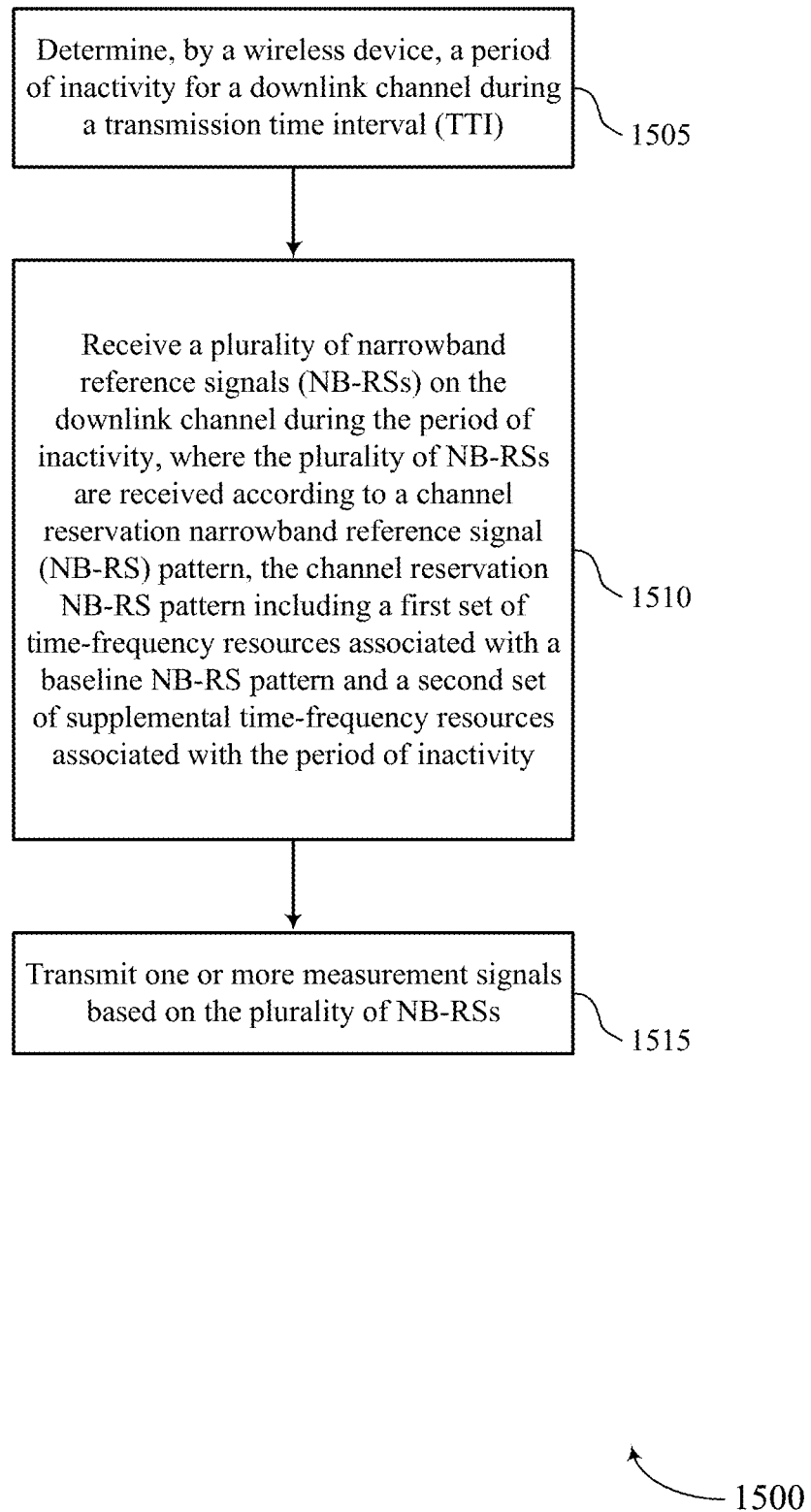

FIG. 15 shows a flowchart illustrating a method 1500 for bandwidth reservation signal for base station operation in digital modulation in accordance with aspects of the present disclosure. The operations of method 1500 may be implemented by a UE 115 or its components as described herein. For example, the operations of method 1500 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may determine a period of inactivity for a downlink channel during a transmission time interval (TTI). The operations of 1505 may be performed according to the methods described herein. In certain examples, aspects of the operations of 1505 may be performed by a inactivity period identifier as described with reference to FIGS. 10 through 13.

At 1510, the UE 115 may receive a plurality of narrowband reference signals (NB-RSs) on the downlink channel during the period of inactivity, where the plurality of reference signals are received according to a channel reservation narrowband reference signal (NB-RS) pattern, the channel reservation NB-RS pattern including a first set of time-frequency resources associated with a baseline NB-RS pattern and a second set of supplemental time-frequency resources associated with the period of inactivity. The operations of 1510 may be performed according to the methods described herein. In certain examples, aspects of the operations of 1510 may be performed by a narrowband reference signal processor as described with reference to FIGS. 10 through 13.

At 1515, the UE 115 may transmit one or more measurement signals based at least in part on the plurality of NB-RSs. The operations of 1515 may be performed according to the methods described herein. In certain examples, aspects of the operations of 1515 may be performed by a measurement signal unit as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying, by a wireless device, a plurality of downlink carriers for a transmission time interval (TTI);
identifying a period of inactivity for one or more downlink carriers of the plurality of downlink carriers during the TTI; and
transmitting narrowband reference signals (NB-RSs) over the one or more downlink carriers during the period of inactivity according to a channel reservation narrowband reference signal (NB-RS) pattern, the channel reservation NB-RS pattern comprising a first set of time-frequency resources associated with a baseline NB-RS pattern and a second set of supplemental time-frequency resources associated with the period of inactivity.

2. The method of claim 1, further comprising:
boosting a power of the NB-RSs transmitted during the period of inactivity.

3. The method of claim 2, further comprising:
transmitting the NB-RSs using the boosted power, wherein the boosted power is a multiple of a baseline power associated with reference signal transmission during periods of activity.

4. The method of claim 1, wherein:
the first set of time-frequency resources comprises a first set orthogonal frequency division multiplexing (OFDM) symbols; and
the second set of time-frequency resources comprises a second set of OFDM symbols.

5. The method of claim 4, wherein the first set of OFDM symbols comprises a sixth OFDM symbol of the TTI, a seventh OFDM symbol of the TTI, a thirteenth OFDM symbol of the TTI, and a fourteenth OFDM symbol of the TTI.

6. The method of claim 5, wherein the second set of OFDM symbols comprises a first OFDM symbol of the TTI, a second OFDM symbol of the TTI, a fifth OFDM symbol of the TTI, an eighth OFDM symbol of the TTI, a ninth OFDM symbol of the TTI, and a twelfth OFDM symbol of the TTI.

7. The method of claim 1, wherein the second set of time-frequency resources comprises time-frequency resources associated with cell-specific reference signals.

8. A method for wireless communication, comprising:
determining, by a wireless device, a period of inactivity for a downlink channel during a transmission time interval (TTI);
receiving a plurality of narrowband reference signals (NB-RSs) on the downlink channel during the period of inactivity, wherein the plurality of NB-RSs are received according to a channel reservation narrowband reference signal (NB-RS) pattern, the channel reservation NB-RS pattern comprising a first set of time-frequency resources associated with a baseline NB-RS pattern and a second set of supplemental time-frequency resources associated with the period of inactivity; and
transmitting one or more measurement signals based at least in part on the plurality of NB-RSs.

9. The method of claim 8, wherein:
the first set of time-frequency resources comprises a first set of orthogonal frequency division multiplexing (OFDM) symbols; and
the second set of time-frequency resources comprises a second OFDM symbols.

10. The method of claim 9, wherein the first set of OFDM symbols comprises a sixth OFDM symbol of the TTI, a seventh OFDM symbol of the TTI, a thirteenth OFDM symbol of the TTI, and a fourteenth OFDM symbol of the TTI.

11. The method of claim 10, wherein the second set of OFDM symbols comprises a first OFDM symbol of the TTI, a second OFDM symbol of the TTI, a fifth OFDM symbol of the TTI, an eighth OFDM symbol of the TTI, a ninth OFDM symbol of the TTI, and a twelfth OFDM symbol of the TTI.

12. The method of claim 8, wherein the second set of time-frequency resources comprises time-frequency resources associated with cell-specific resource signals.

13. An apparatus for wireless communication, comprising:
a processor;
memory in electronic communication with the processor; and
instructions stored in the memory, wherein the instructions are executable by the processor to:
identify, by a wireless device, a plurality of downlink carriers for a transmission time interval (TTI);
identify a period of inactivity for one or more downlink carriers of the plurality of downlink carriers during the TTI; and
transmit narrowband reference signals (NB-RSs) over the one or more downlink carriers during the period of inactivity according to a channel reservation narrowband reference signal (NB-RS) pattern, the channel reservation NB-RS pattern comprising a first set of time-frequency resources associated with a baseline NB-RS pattern and a second set of supplemental time-frequency resources associated with the period of inactivity.

14. The apparatus of claim 13, wherein the instructions are further executable by the processor to:
boost a power of the NB-RSs transmitted during the period of inactivity.

15. The apparatus of claim 14, wherein the instructions are further executable by the processor to:
transmit the NB-RSs using the boosted power, wherein the boosted power is a multiple of a baseline power associated with reference signal transmission during periods of activity.

16. The apparatus of claim 13, wherein:
the first set of time-frequency resources comprises a first set orthogonal frequency division multiplexing (OFDM) symbols; and
the second set of time-frequency resources comprises a second set of OFDM symbols.

17. The apparatus of claim 16, wherein the first set of OFDM symbols comprises a sixth OFDM symbol of the TTI, a seventh OFDM symbol of the TTI, a thirteenth OFDM symbol of the TTI, and a fourteenth OFDM symbol of the TTI.

18. The apparatus of claim 17, wherein the second set of OFDM symbols comprises a first OFDM symbol of the TTI, a second OFDM symbol of the TTI, a fifth OFDM symbol of the TTI, an eighth OFDM symbol of the TTI, a ninth OFDM symbol of the TTI, and a twelfth OFDM symbol of the TTI.

19. The apparatus of claim 13, wherein the second set of time-frequency resources comprises time-frequency resources associated with cell-specific reference signals.

20. An apparatus for wireless communication, comprising:
a processor;
memory in electronic communication with the processor; and
instructions stored in the memory, wherein the instructions are executable by the processor to:
determine, by a wireless device, a period of inactivity for a downlink channel during a transmission time interval (TTI);
receive a plurality of narrowband reference signals (NB-RSs) on the downlink channel during the period of inactivity, wherein the plurality of NB-RSs are received according to a channel reservation narrowband reference signal (NB-RS) pattern, the channel reservation NB-RS pattern comprising a first set of time-frequency resources associated with a baseline NB-RS pattern and a second set of supplemental time-frequency resources associated with the period of inactivity; and
transmit one or more measurement signals based at least in part on the plurality of NB-RSs.

21. The apparatus of claim 20, wherein:
the first set of time-frequency resources comprises a first set of orthogonal frequency division multiplexing (OFDM) symbols; and
the second set of time-frequency resources comprises a second OFDM symbols.

22. The apparatus of claim 21, wherein the first set of OFDM symbols comprises a sixth OFDM symbol of the TTI, a seventh OFDM symbol of the TTI, a thirteenth OFDM symbol of the TTI, and a fourteenth OFDM symbol of the TTI.

23. The apparatus of claim 22, wherein the second set of OFDM symbols comprises a first OFDM symbol of the TTI, a second OFDM symbol of the TTI, a fifth OFDM symbol of the TTI, an eighth OFDM symbol of the TTI, a ninth OFDM symbol of the TTI, and a twelfth OFDM symbol of the TTI.

24. The apparatus of claim 20, wherein the second set of time-frequency resources comprises time-frequency resources associated with cell-specific resource signals.

* * * * *